(12) United States Patent
Lee et al.

(10) Patent No.: US 10,728,658 B2
(45) Date of Patent: Jul. 28, 2020

(54) ELECTRONIC CIRCUIT FOR PROTECTING ELEMENT FROM OVER-VOLTAGE AND ELECTRONIC DEVICE INCLUDING THE SAME

(71) Applicant: Samsung Electronics Co., Ltd., Suwon-si, Gyeonggi-do (KR)

(72) Inventors: Myung-Jin Lee, Suwon-si (KR); Young-Hun Kim, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/983,460

(22) Filed: May 18, 2018

(65) Prior Publication Data

US 2019/0098404 A1    Mar. 28, 2019

(30) Foreign Application Priority Data

Sep. 27, 2017   (KR) ......................... 10-2017-0125038

(51) Int. Cl.
*H04R 3/00* (2006.01)
*H02H 1/00* (2006.01)
(Continued)

(52) U.S. Cl.
CPC ........... *H04R 3/007* (2013.01); *H02H 1/0007* (2013.01); *H02H 7/20* (2013.01); *H01R 13/7039* (2013.01);
(Continued)

(58) Field of Classification Search
CPC ............... H04R 3/007; H04R 13/7039; H04R 2420/05; H02H 1/0007; H02H 7/20
See application file for complete search history.

(56) References Cited

U.S. PATENT DOCUMENTS

| 5,768,601 A | 6/1998 | Tran |
| 5,835,328 A | 11/1998 | Maloney et al. |

(Continued)

FOREIGN PATENT DOCUMENTS

| CN | 101937681 B | 6/2013 |
| CN | 102082983 B | 11/2013 |

(Continued)

*Primary Examiner* — Ping Lee
(74) *Attorney, Agent, or Firm* — Harness, Dickey & Pierce, P.L.C.

(57) ABSTRACT

An electronic circuit includes an output generator and an over-voltage detector. The output generator is configured to output an output signal to an output terminal. In response to an amplitude of a voltage of the output terminal being greater than an allowable amplitude, the over-voltage detector is configured to output an over-voltage detection signal of a first logic value, such that elements included in the output generator are turned off. In response to the over-voltage detector outputting the over-voltage detection signal of the first logic value again before a reference time elapses after the first logic value of the over-voltage detection signal changes to a second logic value of the over-voltage detection signal, the turned-off elements remain turned off. In response to the over-voltage detector outputting the over-voltage detection signal of the second logic value during the reference time, the turned-off elements are turned on.

20 Claims, 15 Drawing Sheets

(51) Int. Cl.
  *H02H 7/20* (2006.01)
  *H01R 13/703* (2006.01)
  *H02H 9/04* (2006.01)

(52) U.S. Cl.
  CPC ............ *H02H 9/041* (2013.01); *H02H 9/046* (2013.01); *H04R 2420/05* (2013.01)

(56) References Cited

U.S. PATENT DOCUMENTS

| | | |
|---|---|---|
| 5,886,586 A | 3/1999 | Lai et al. |
| 6,525,605 B2 | 2/2003 | Hu et al. |
| 6,611,169 B2 | 8/2003 | Mendenhall |
| 7,030,700 B2 | 4/2006 | Wong et al. |
| 7,167,055 B2 | 1/2007 | Wong et al. |
| 7,327,187 B2 | 2/2008 | Lee |
| 7,701,287 B2 | 4/2010 | Cheng et al. |
| 8,139,334 B2 | 3/2012 | Saarinen |
| 8,218,282 B2 | 7/2012 | Lin |
| 8,218,776 B2 | 7/2012 | Wu |
| 8,611,169 B2 | 12/2013 | Houle et al. |
| 8,681,458 B2 | 3/2014 | Robb et al. |
| 9,646,598 B2 | 5/2017 | Lee et al. |
| 2005/0231287 A1* | 10/2005 | Wong .................. H03F 1/52 330/298 |
| 2006/0245131 A1* | 11/2006 | Ramey ................. H02J 7/0029 361/90 |

FOREIGN PATENT DOCUMENTS

| | | |
|---|---|---|
| JP | 4916478-82 | 4/2012 |
| JP | 4916478 B2 | 4/2012 |
| KR | 2005-0014986 A | 2/2005 |
| KR | 10-0538628 B1 | 12/2005 |
| KR | 2007-0022442 A | 2/2007 |
| TW | 200926581 A | 6/2009 |

\* cited by examiner

FIG. 6

| OVD | LDET | JCD | State |
|---|---|---|---|
| 0 | 0 | 0 | Jack-in |
| 0 | 1 | 1 | Jack-out |
| 1 | 0 | 0 | Jack-in |
| 1 | 1 | 0 | Jack-out Masking |

ELECTRONIC CIRCUIT FOR PROTECTING ELEMENT FROM OVER-VOLTAGE AND ELECTRONIC DEVICE INCLUDING THE SAME

CROSS-REFERENCE TO RELATED APPLICATIONS

The present application claims priority under 35 U.S.C. § 119 to Korean Patent Application No. 10-2017-0125038 filed on Sep. 27, 2017, in the Korean Intellectual Property Office, the entire contents of which are incorporated herein by reference.

TECHNICAL FIELD

The present disclosure relates to an electronic circuit and an electronic device, and more particularly, relates to configurations and operations for controlling an operation of an element included in the electronic circuit or the electronic device.

DISCUSSION OF RELATED ART

In recent years, various kinds of electronic devices are being used. An electronic device performs its own functions according to operations of electronic circuits included therein. For example, various electronic devices, such as a desktop computer, a smart phone, a tablet computer, and the like, are widely being used by users, and each electronic device provides a service to a user. For example, an electronic device such as a smart phone may include an audio chip to play audio.

An electronic circuit is implemented including various elements (e.g., passive elements such as a resistor, a capacitor, and/or the like, and active elements such as a diode, a transistor, and/or the like). A voltage and a current are provided to the elements of the electronic circuit to operate the electronic circuit, and thus the electronic circuit performs its own operations.

Each element included in the electronic circuit may provide an intended operation based on a voltage and a current within a specific range. When a voltage or a current, which is outside of an allowable range for an element, is provided to the element, the element may not provide an intended operation. In addition, when an excessively high voltage or current is provided to an element, the element may be damaged.

For example, an electronic device (e.g., a smart phone) may include an external terminal for interfacing with an external entity (e.g., a user may connect an audio jack of a headphone or in-ear headphone to an audio terminal of the smart phone), and a voltage and a current may be provided to elements of the electronic circuit through the external terminal (e.g., an audio signal output from the audio chip may be transmitted to the headphone or in-ear headphone through the audio jack, such that the user may listen to the audio being played). In some cases, an excessively high voltage (e.g., a surge voltage) may be applied to the interior of the electronic device through the external terminal, which may damage the elements of the electronic circuit. For example, a child may insert a conductive foreign material into the audio terminal, a sheath of a cable of the headphone or in-ear headphone may be peeling off, or an insulation characteristic of the headphone or in-ear headphone may be faulty. In such cases, an over-voltage may be applied to the audio chip, such that transistors of the audio chip may be damaged.

An electronic circuit and an electronic device which include the damaged elements may cause a misoperation, and may not provide an intended service. Accordingly, it is desirable for the electronic circuit and the electronic device to protect the elements of the electronic circuit from an excessively high voltage and current such that the elements of the electronic circuit are not damaged. For example, it may be desirable to provide a configuration and an operation for protecting the transistors of the audio chip against the over-voltage.

SUMMARY

Example embodiments of the present disclosure may provide configurations and operations for controlling operations of elements of an electronic circuit to protect the elements of the electronic circuit against an over-voltage. In addition, the example embodiments may provide operations for preventing a misoperation due to an over-voltage and preventing noise from being generated.

In some example embodiments, an electronic circuit may include an output generator and an over-voltage detector. The output generator may include switches on a path and configured to generate an output signal based on input data. The output generator may include transistors configured to drive an output of the output signal to an output terminal. In response to an amplitude of a voltage of the output terminal being greater than an allowable amplitude, the over-voltage detector may be configured to provide an over-voltage detection signal of a first logic value to the output generator, such that the switches and the transistors are turned off. The output generator may be configured to generate a converted over-voltage detection signal of a first logic value based on the over-voltage detection signal, such that the switches and the transistors, which have been turned off in response to the first logic value of the over-voltage detection signal, remain turned off. In response to the over-voltage detection signal of the first logic value not being received again during a reference time after the first logic value of the over-voltage detection signal changes to a second logic value of the over-voltage detection signal, the output generator may be configured to generate the converted over-voltage detection signal of a second logic value, such that the switches and the transistors, which have remained turned off in response to the first logic value of the converted over-voltage detection signal, are turned on. In response to the over-voltage detection signal of the first logic value being received again from the over-voltage detector before the reference time elapses, the output generator may be configured to maintain the converted over-voltage detection signal of the first logic value.

In some example embodiments, an electronic circuit may include an output generator and an over-voltage detector. The output generator may be configured to output an output signal to an output terminal. In response to an amplitude of a voltage of the output terminal being greater than an allowable amplitude, the over-voltage detector may be configured to output an over-voltage detection signal of a first logic value, such that elements included in the output generator are turned off. The elements, which have been turned off in response to the first logic value of the over-voltage detection signal, may remain turned off, at least until a reference time elapses after the first logic value of the over-voltage detection signal changes to a second logic value of the over-voltage detection signal. In response to the first logic value of the over-voltage detection signal changing to the second logic value of the over-voltage detection signal and then the over-voltage detector outputting the over-voltage detection signal of the first logic value again before the reference time elapses, the elements, which have been turned off in response to the first logic value of the over-voltage detection signal, may continue to remain turned off. In response to the over-voltage detector continuing to output the over-voltage detection signal of the second logic value during the reference time, the elements, which have been turned off in response to the first logic value of the over-voltage detection signal, may be turned on.

In some example embodiments, an electronic device may include a first processor and a second processor. The first processor may be configured to output data. The second processor may be configured to output an output signal to an external terminal based on the data output from the first processor. In response to an amplitude of a voltage of the external terminal being greater than an allowable amplitude, elements included in the second processor may be turned off. The turned-off elements may remain turned off, at least until a reference time elapses after the amplitude of the voltage of the external terminal greater than the allowable amplitude changes to be less than the allowable amplitude. The turned-off elements may be turned on, in response to the amplitude of the voltage of the external terminal which changed to be less than the allowable amplitude not becoming greater than the allowable amplitude during the reference time.

In some example embodiments, an electronic circuit may include an output generator and an over-voltage detector. The output generator may be configured to output an output signal to an output terminal. The over-voltage detector may be configured to provide an over-voltage detection signal to the output generator, such that active elements included in the output generator are turned off. The over-voltage detector may include resistive elements, a first comparator, a second comparator, and a logic circuit. The resistive elements may be configured to divide a voltage of the output terminal to output a divided voltage. The first comparator may be configured to compare the divided voltage with a first reference voltage, and to output a first comparison result associated with whether the voltage of the output terminal is higher than a positive allowable voltage. The second comparator may be configured to compare the divided voltage with a second reference voltage lower than the first reference voltage, and to output a second comparison result associated with whether the voltage of the output terminal is lower than a negative allowable voltage. The logic circuit may be configured to generate the over-voltage detection signal based on the first comparison result and the second comparison result.

According to some example embodiments, elements of an electronic circuit may be prevented from being damaged by an over-voltage. Accordingly, reliability and stability of the electronic circuit and an electronic device including the electronic circuit may be obtained. According to some example embodiments, a fewer number of protection elements may be used, and thus cost of manufacturing the electronic circuit and the electronic device may be reduced.

In some example embodiments, a misoperation due to an over-voltage may be prevented, and noise which may be noticeable by a user may be prevented from being generated. Accordingly, reliability and stability of the electronic circuit and the electronic device may be obtained.

BRIEF DESCRIPTION OF THE DRAWINGS

The above and other objects and features of the present invention will become apparent from the following descriptions with reference to the accompanying figures.

FIG. 6 is a block diagram illustrating an example configuration of an audio signal processor of FIG. 3.

DETAILED DESCRIPTION

Below, some example embodiments will be described in detail and clearly with reference to accompanied drawings such that those skilled in the art can easily implement the example embodiments.

1. Overall System Configuration

Figure 1:
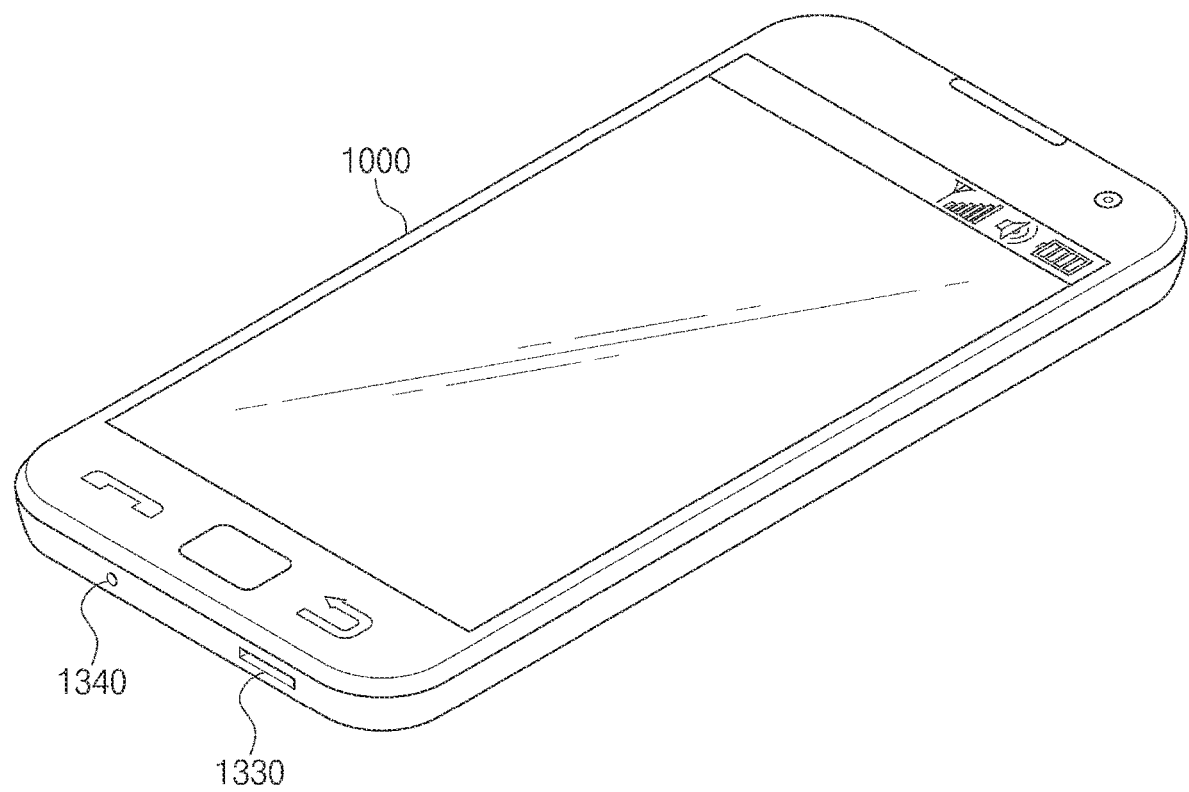
FIG. 1 is a conceptual diagram illustrating an example implementation of an electronic device configured and operating according to some example embodiments.

FIG. 1 is a conceptual diagram illustrating an example implementation of an electronic device 1000 that is configured and operates according to some example embodiments.

For example, the electronic device 1000 may be implemented with an electronic device such as a smart phone, a tablet computer, a laptop computer, and/or the like. However, the present invention is not limited thereto. Unlike the illustration of FIG. 1, however, the electronic device 1000 may be implemented with various other types of electronic devices such as a wearable device, a desktop computer, a video game console, a workstation, a server, an electric vehicle, a home appliance, a medical device, and/or the like.

The electronic device 1000 may provide various services to a user according to operations of electronic circuits included in the electronic device 1000. For example, the electronic device 1000 may play audio. The user may play multimedia content including sound information, such as music, a voice message, a video, and/or the like, by using the electronic device 1000.

For example, the electronic device 1000 may include a speaker 1330 for outputting the audio being played to the user. For example, the electronic device 1000 may include an audio terminal 1340 that is able to be connected with a headphone or an in-ear headphone for outputting the audio being played to the user. For example, the electronic device 1000 may include a communication circuit for outputting the audio being played to a speaker or a headphone. Accordingly, the user may listen to the audio being played by the electronic device 1000.

However, the audio playback is an example provided to facilitate better understanding, and is not intended to limit the present invention. The electronic device 1000 may further provide various other functions in addition to the audio playback.

Figure 2:
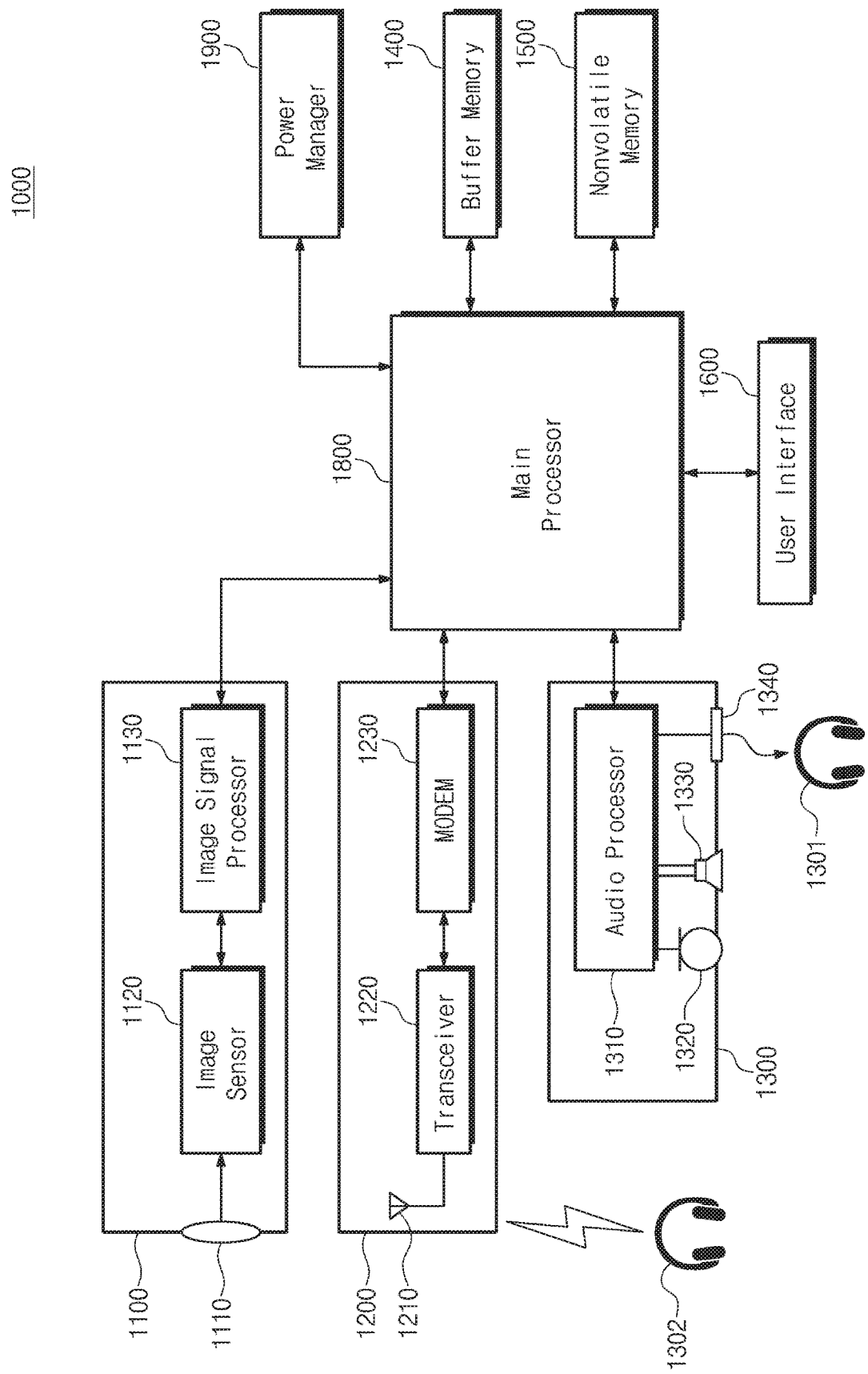
FIG. 2 is a block diagram illustrating an example configuration of an electronic device of FIG. 1, which includes an electronic circuit configured and operating according to some example embodiments.

FIG. 2 is a block diagram illustrating an example configuration of the electronic device 1000 which includes an electronic circuit configured and operating according to some example embodiments.

The electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a main processor 1800, and a power manager 1900.

The image processing block 1100 may be configured to receive light through a lens 1110. An image sensor 1120 and an image signal processor 1130 included in the image processing block 1100 may be configured to generate image information associated with an external object based on the received light.

The communication block 1200 may be configured to exchange signals with an external device/system through an antenna 1210. A transceiver 1220 and a modulator/demodulator (MODEM) 1230 of the communication block 1200 may be configured to process signals exchanged with the external device/system, in compliance with a wireless communication protocol such as long term evolution (LTE), worldwide interoperability for microwave access (WI-MAX), global system for mobile communication (GSM), code division multiple access (CDMA), Bluetooth, near field communication (NFC), wireless fidelity (Wi-Fi), radio frequency identification (RFID), and/or the like.

The audio processing block 1300 may be configured to process sound information by using an audio processor 1310, and thus may be configured to play and output the audio. The audio processing block 1300 may be configured to receive an audio input through a microphone 1320. The audio processing block 1300 may be configured to output the audio being played through the speaker 1330. A headphone 1301 may be connected with the audio terminal 1340 of the audio processing block 1300, and the audio processing block 1300 may be configured to output the audio being played through the headphone 1301.

In some cases, a headphone 1302 may be wirelessly connected to the communication block 1200 (e.g., in compliance with a wireless communication protocol such as Bluetooth, NFC, and/or the like). A signal of the audio being played by the audio processing block 1300 may be output to the headphone 1302 wirelessly through the communication block 1200. To this end, the audio processing block 1300 may be configured to communicate with the communication block 1200 directly or through the main processor 1800.

The buffer memory 1400 may be configured to store data used in an operation of the electronic device 1000. For example, the buffer memory 1400 may be configured to temporarily store data processed or to be processed by the main processor 1800. For example, the buffer memory 1400 may include a volatile memory, such as a static random access memory (SRAM), a dynamic RAM (DRAM), a synchronous DRAM (SDRAM), and/or the like, and/or a nonvolatile memory, such as a flash memory, a phase-change RAM (PRAM), a magneto-resistive RAM (MRAM), a resistive RAM (ReRAM), a ferroelectric RAM (FRAM), and/or the like.

The nonvolatile memory 1500 may be configured to store data regardless of power being supplied. For example, the nonvolatile memory 1500 may include at least one of various nonvolatile memories such as a flash memory, a PRAM, an MRAM, a ReRAM, an FRAM, and/or the like. For example, the nonvolatile memory 1500 may include a removable memory such as a hard disk drive (HDD), a solid state drive (SSD), or a secure digital (SD) card, and/or an embedded memory such as an embedded multimedia card (eMMC).

The user interface 1600 may be configured to arbitrate communication between a user and the electronic device 1000. For example, the user interface 1600 may include input interfaces such as a keyboard, a mouse, a keypad, a button, a touch panel, a touch screen, a touch pad, a touch ball, a gyroscope sensor, a vibration sensor, an acceleration sensor, and/or the like. For example, the user interface 1600 may include output interfaces such as a liquid crystal display (LCD) device, a light emitting diode (LED) display device, an organic LED (OLED) display device, an active matrix OLED (AMOLED) display device, a motor, an LED lamp, and/or the like.

The main processor 1800 may be configured to control overall operations of the electronic device 1000. The main processor 1800 may be configured to process various operations to operate the electronic device 1000. For example, the main processor 1800 may be implemented with a general-purpose processor, a special-purpose processor, or an application processor.

The power manager 1900 may be configured to power components of the electronic device 1000. For example, the power manager 1900 may be configured to suitably convert power received from a battery and/or an external power source, and to transfer the converted power to the components of the electronic device 1000.

However, the example components illustrated in FIG. 2 are provided to facilitate better understanding, and are not intended to limit the present invention. The electronic device 1000 may not include one or more of the components illustrated in FIG. 2, and/or may further include at least one component which is not illustrated in FIG. 2.

Meanwhile, for example, the buffer memory 1400 and/or the nonvolatile memory 1500 may be configured to store sound source data. The electronic device 1000 may be configured to provide a service based on the sound source data stored in the buffer memory 1400 and/or the nonvolatile memory 1500. For example, the nonvolatile memory 1500 may be configured to store sound source data provided from a user. For example, the buffer memory 1400 may be configured to store sound source data which is streamed through the communication block 1200. The sound source data may include sound information, and the audio processor 1310 may be configured to play audio based on the sound source data.

The audio processor 1310 may be implemented including various elements. A voltage for operating the audio processor 1310 may be provided to the elements of the audio processor 1310. Accordingly, the audio processor 1310 may be configured to perform its own operations.

However, when a voltage outside of an allowable range for the elements of the audio processor 1310 is provided to the elements, the elements may not provide an intended operation. In addition, when an excessively high voltage is provided to the elements, the elements may be damaged. For example, when a voltage exceeding a breakdown voltage is provided to a transistor included in the audio processor 1310, the transistor may be damaged.

In some cases, an excessively high voltage (e.g., a surge voltage) may be applied to the audio processor 1310 through an external terminal (e.g., the audio terminal 1340). For example, when a conductive foreign material is inserted into the audio terminal 1340, an excessively high voltage may be applied to the audio processor 1310. For example, when a sheath of a cable of the headphone 1301 connected to the audio terminal 1340 is peeled off or an insulation characteristic of the headphone 1301 connected to the audio terminal 1340 is faulty, an excessively high voltage may be applied to the audio processor 1310. In this case, the elements of the audio processor 1310 may be damaged.

When the elements of the audio processor 1310 are damaged, the audio processor 1310 and the electronic device 1000 may cause a misoperation or a service for audio playback may not be provided. Accordingly, some example embodiments may be configured to protect the elements of the audio processor 1310 against an excessively high voltage, such that the elements of the audio processor 1310 are not damaged. An excessively high voltage outside of an allowable range for the elements of the audio processor 1310 may be referred to as an "over-voltage" herein.

In addition to the audio processor 1310, elements of other electronic circuits included in the electronic device 1000 may also be damaged by an excessively high voltage. Therefore, the elements of the other electronic circuits of the electronic device 1000 may also be protected against an excessively high voltage according to some example embodiments.

In the following descriptions, examples associated with the audio processor 1310 that is able to be configured and to operate according to some example embodiments will be provided. However, the following examples are provided to facilitate better understanding, and are not intended to limit the present invention. It may be readily understood that the example embodiments of the present disclosure may be employed in any electronic circuit and any electronic device in addition to the audio processor 1310.

II. Example Configuration Associated with Audio Processor

Figure 3:
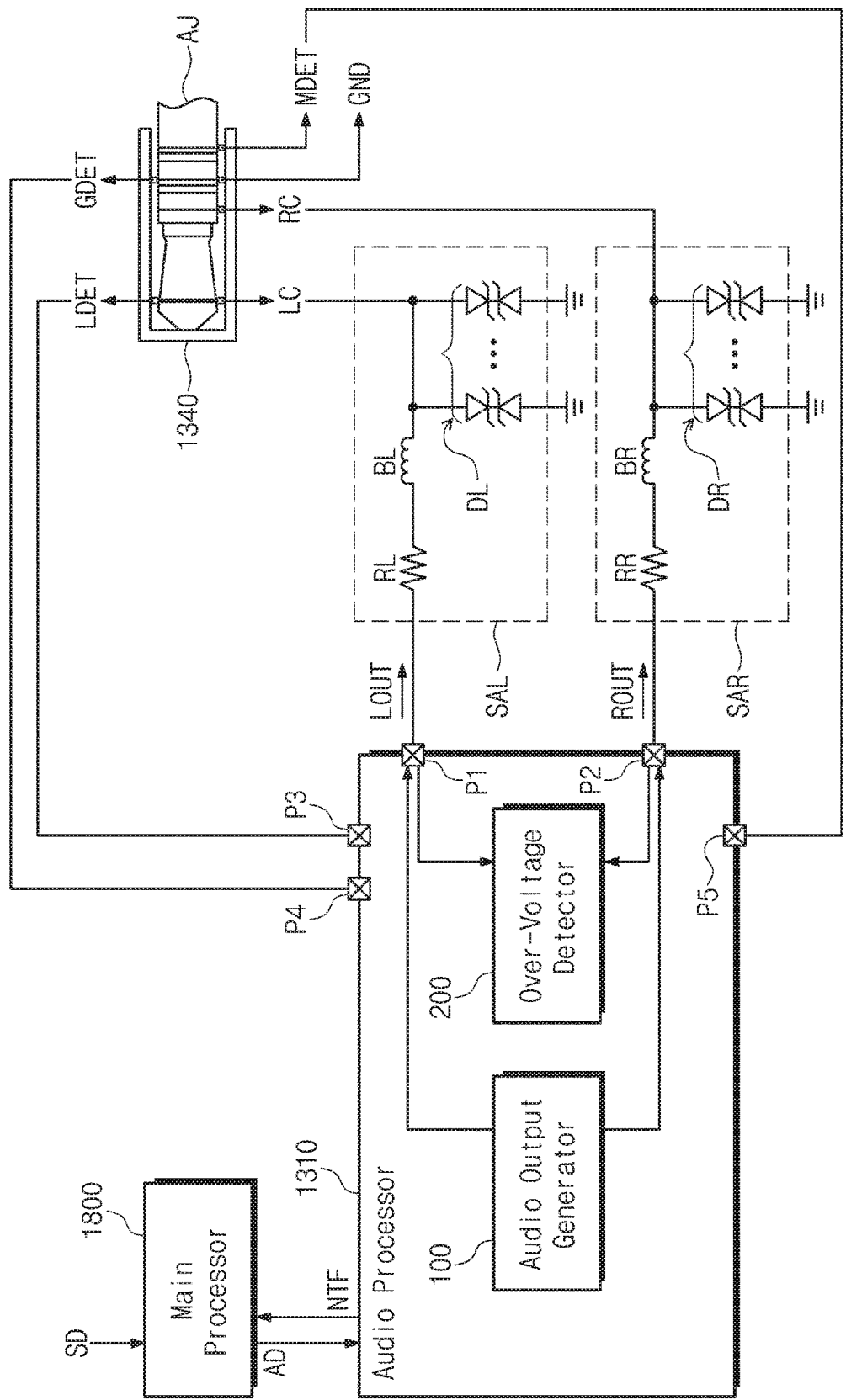
FIG. 3 is a block diagram illustrating an example configuration associated with an audio processor and a main processor of FIG. 2.

FIG. 3 is a block diagram illustrating an example configuration associated with the audio processor 1310 and the main processor 1800 of FIG. 2.

The main processor 1800 may be configured to receive sound source data SD from a memory (e.g., the buffer memory 1400, the nonvolatile memory 1500, and/or the like). The main processor 1800 may be configured to convert (e.g., serialize) the sound source data SD suitably to output audio data AD. The audio data AD may include sound information associated with the sound source data SD. The main processor 1800 may be referred to as a "first electronic circuit" herein.

The audio processor 1310 may be configured to provide an audio playback service based on the audio data AD. The audio processor 1310 may be referred to as a "second electronic circuit" herein. However, the second electronic circuit may additionally or alternatively mean other electronic circuits configured and operating according to some example embodiments, in addition to the audio processor 1310.

In some example embodiments, the audio processor 1310 may include an audio output generator 100 and an over-voltage detector 200. The audio output generator 100 and the over-voltage detector 200 may be implemented with analog/digital circuits including various passive/active/logic elements to provide operations and functions, which will be described below.

The audio output generator 100 is provided as an example herein. However, when example embodiments are employed in a different electronic circuit or electronic device other than the audio processor 1310, an output generator of a different type other than the audio output generator 100 may be implemented.

The audio output generator 100 may be configured to generate an output signal (e.g., audio output signals LOUT and ROUT) based on input data (e.g., the audio data AD). The audio output signals LOUT and ROUT may be output to allow a user to listen to audio played by the electronic device 1000. For example, the audio output signal LOUT may correspond to sound to be heard by a left ear of the user, and the audio output signal ROUT may correspond to sound to be heard by a right ear of the user.

The audio output generator 100 may be configured to output the output signal to an output terminal. For example, the audio output generator 100 may be configured to output the audio output signals LOUT and ROUT to output terminals P1 and P2, respectively. In some example embodiments, the audio output generator 100 may be implemented with an electronic circuit chip, and the output terminals P1 and P2 may include pads provided to connect the electronic circuit chip to an external object.

The output signal from the audio output generator 100 may be provided to an external terminal. The external terminal may be provided for interfacing with an external environment, and may be connected to an external object (e.g., an external connector) which is separate from the electronic device 1000. In the example of FIG. 3, the external terminal may include the audio terminal 1340, and the external connector may include an audio jack AJ which is able to be connected to the audio terminal 1340. The audio jack AJ may be, for example, a 3.5 pi connector provided at the end tip of the headphone 1301.

For example, the audio output signals LOUT and ROUT may be provided to the audio terminal 1340. When the audio jack AJ is completely connected to the audio terminal 1340, a left channel contact LC and a right channel contact RC of the audio terminal 1340 may be in contact with the audio jack AJ. Accordingly, the audio output signals LOUT and ROUT may be respectively transmitted to the audio jack AJ through the left and right channel contacts LC and RC, and thus the user may listen to the audio being played through the headphone 1301.

The audio terminal 1340 may include contacts associated with a connection signal LDET and a ground signal GDET. The connection signal LDET and the ground signal GDET may be referenced to determine whether the external connector (e.g., the audio jack AJ) is connected to the external terminal (e.g., the audio terminal 1340).

For example, when the audio jack AJ is not connected to the audio terminal 1340, a level of each of the connection signal LDET and the ground signal GDET may correspond to a first logic value (e.g., logic "1"). On the other hand, when the audio jack AJ is connected to the audio terminal 1340, a level of each of the connection signal LDET and the ground signal GDET may correspond to a second logic value (e.g., logic "0"). Herein, the signal level may be a voltage level, but the present invention is not limited thereto.

Meanwhile, for example, when a whole portion of the audio jack AJ is not connected to the audio terminal 1340, but rather only a half portion of the audio jack AJ is connected to the audio terminal 1340, a level of the connection signal LDET may correspond to the first logic value and a level of the ground signal GDET may correspond to the second logic value. Accordingly, the connection signal LDET and the ground signal GDET may be referenced to determine whether the audio jack AJ is completely connected to the audio terminal 1340.

The connection signal LDET and the ground signal GDET may be provided to the audio processor 1310 through pads P3 and P4, respectively. The audio processor 1310 may be configured to determine whether the audio jack AJ is connected to the audio terminal 1340, based on the connection signal LDET and the ground signal GDET. In some example embodiments, the audio processor 1310 may be configured to provide the main processor 1800 with a notification NTF indicating a result of the determination.

When the audio jack AJ is not connected to the audio terminal 1340, the audio processor 1310 may be configured to provide the main processor 1800 with the notification NTF indicating absence of the audio jack AJ. In this case, the main processor 1800 may be configured to operate to provide a service of audio playback through the speaker 1330, in response to the notification NTF.

On the other hand, when the audio jack AJ is connected to the audio terminal 1340, the audio processor 1310 may be configured to provide the main processor 1800 with the notification NTF indicating that the audio jack AJ is connected. In this case, the main processor 1800 may be configured to operate to provide a service of audio playback through the headphone 1301, in response to the notification NTF.

A ground contact GND of the audio terminal 1340 may be provided to have a ground level. The ground level may provide a reference potential in operations associated with the audio terminal 1340 and the audio jack AJ. The ground level may correspond to the second logic value (e.g., logic "0").

The audio terminal 1340 may include a contact associated with a microphone signal MDET. The microphone signal MDET may indicate whether the headphone 1301 connected through the audio jack AJ includes a microphone circuit. The audio processor 1310 may be configured to receive the microphone signal MDET through a pad P5. When the headphone 1301 includes the microphone circuit, the audio processor 1310 may be configured to receive an audio input through the pad P5.

Meanwhile, as described with reference to FIG. 2, an over-voltage may be applied to the audio processor 1310 through the audio terminal 1340. Surge attenuation circuits SAL and SAR may be configured to attenuate an amplitude of an over-voltage applied to the audio processor 1310 through the audio terminal 1340. That is, the surge attenuation circuits SAL and SAR may be configured to prevent elements of the audio processor 1310 from being damaged due to the over-voltage.

The surge attenuation circuit SAL may be connected between the left channel contact LC and the output terminal P1. The surge attenuation circuit SAL may include a resistive element RL, a bead BL, and diodes DL. The resistive element RL, the bead BL, and the diodes DL may be configured to attenuate an amplitude of an over-voltage (in particular, an over-voltage of a high frequency component) applied from the left channel contact LC.

The surge attenuation circuit SAR may be connected between the right channel contact RC and the output terminal P2. The surge attenuation circuit SAR may include a resistive element RR, a bead BR, and diodes DR. The resistive element RR, the bead BR, and the diodes DR may be configured to attenuate an amplitude of an over-voltage (in particular, an over-voltage of a high frequency component) applied from the right channel contact RC.

For example, as a resistance value of the resistive element RL or RR increases, a time taken for an over-voltage to come from the left channel contact LC or the right channel contact RC may become longer. In this case, it may be possible to secure a sufficient amount of time to attenuate an amplitude of an over-voltage by the diodes DL or DR, and thus effectively attenuate the amplitude of the over-voltage. However, an intensity of the audio output signal LOUT or ROUT may be attenuated because of voltage dividing on resistance components of the resistive element RL or RR and the headphone 1301, which may cause degradation in a signal-to-noise ratio (SNR) characteristic, and thus may be inefficient.

In addition, there may be a limitation in attenuation provided by elements included in the surge attenuation circuits SAL and SAR (e.g., due to characteristics of the elements). Further, the elements included in the surge attenuation circuits SAL and SAR may not respond to the over-voltage rapidly enough in some cases. Accordingly, even though the surge attenuation circuits SAL and SAR are connected, it may be difficult for them to block the over-voltage completely in some cases.

In some example embodiments, the audio processor 1310 may include the over-voltage detector 200. The over-voltage detector 200 may be configured to detect an over-voltage applied to the audio processor 1310 through the output terminals P1 and P2. When voltages of the output terminals P1 and P2 are excessively high (i.e., when an over-voltage is applied to the audio processor 1310 through the output terminals P1 and P2), the over-voltage detector 200 may be configured to operate to prevent the elements of the audio processor 1310 from being damaged.

In some example embodiments, one over-voltage detector 200 may be provided for both the output terminals P1 and P2. In some other example embodiments, a first over-voltage detector for the output terminal P1 and a second over-voltage detector for the output terminal P2 may be provided separately.

Below, example configurations and example operations of the (first) over-voltage detector 200 for the output terminal P1 will be described with reference to FIGS. 6 to 18. Example configurations and operations of the (second) over-voltage detector for the output terminal P2 may be substantially the same as or similar to those of the (first) overvoltage detector 200 for the output terminal P1, and thus redundant descriptions will not be omitted below for brevity.

Figure 4:
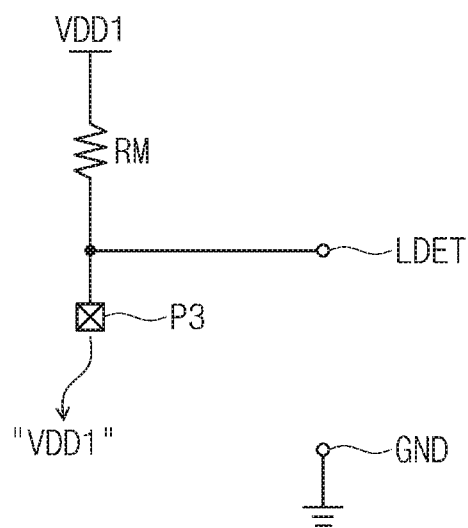
FIGS. 4 and 5 are conceptual diagrams illustrating an example configuration associated with a connection signal of FIG. 3.
Figure 5:
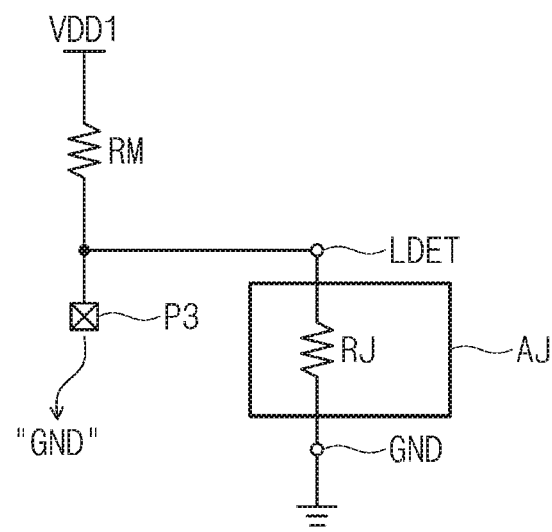

FIGS. 4 and 5 are conceptual diagrams illustrating an example configuration associated with the connection signal LDET of FIG. 3.

Referring to FIG. 4, a contact associated with the connection signal LDET may be connected to the pad P3. A first driving voltage VDD1 may be applied to the pad P3 through a resistive element RM. A resistance value of the resistive element RM may be selected as a relatively high value (e.g., 1 MΩ). A level of the first driving voltage VDD1 may correspond to the first logic value (e.g., logic "1"), and may be provided from a separate voltage generator (e.g., included in the power manager 1900).

When the audio jack AJ is not connected to the audio terminal 1340, the contact associated with the connection signal LDET may be disconnected from the ground contact GND. Accordingly, when the audio jack AJ is not connected to the audio terminal 1340, the level of the connection signal LDET may be pulled up in response to the first driving voltage VDD1, and thus may correspond to the first logic value.

On the other hand, referring to FIG. 5, when the audio jack AJ is connected to the audio terminal 1340, the contact associated with the connection signal LDET may be connected to the ground contact GND through the audio jack AJ. The audio jack AJ may have a resistance component RJ. A resistance value (e.g., 10Ω) of the resistance component RJ may be, for example, substantially lower in relation to the resistance value of the resistive element RM. Accordingly, when the audio jack AJ is connected to the audio terminal 1340, the level of the connection signal LDET may be pulled down to the ground level, and thus may correspond to the second logic value (e.g., logic "0").

A configuration associated with the ground signal GDET may be substantially the same as or similar to the configuration associated with the connection signal LDET described with reference to FIGS. 4 and 5. Accordingly, for brevity, redundant descriptions for a configuration associated with the ground signal GDET will be omitted below.

Figure 6:
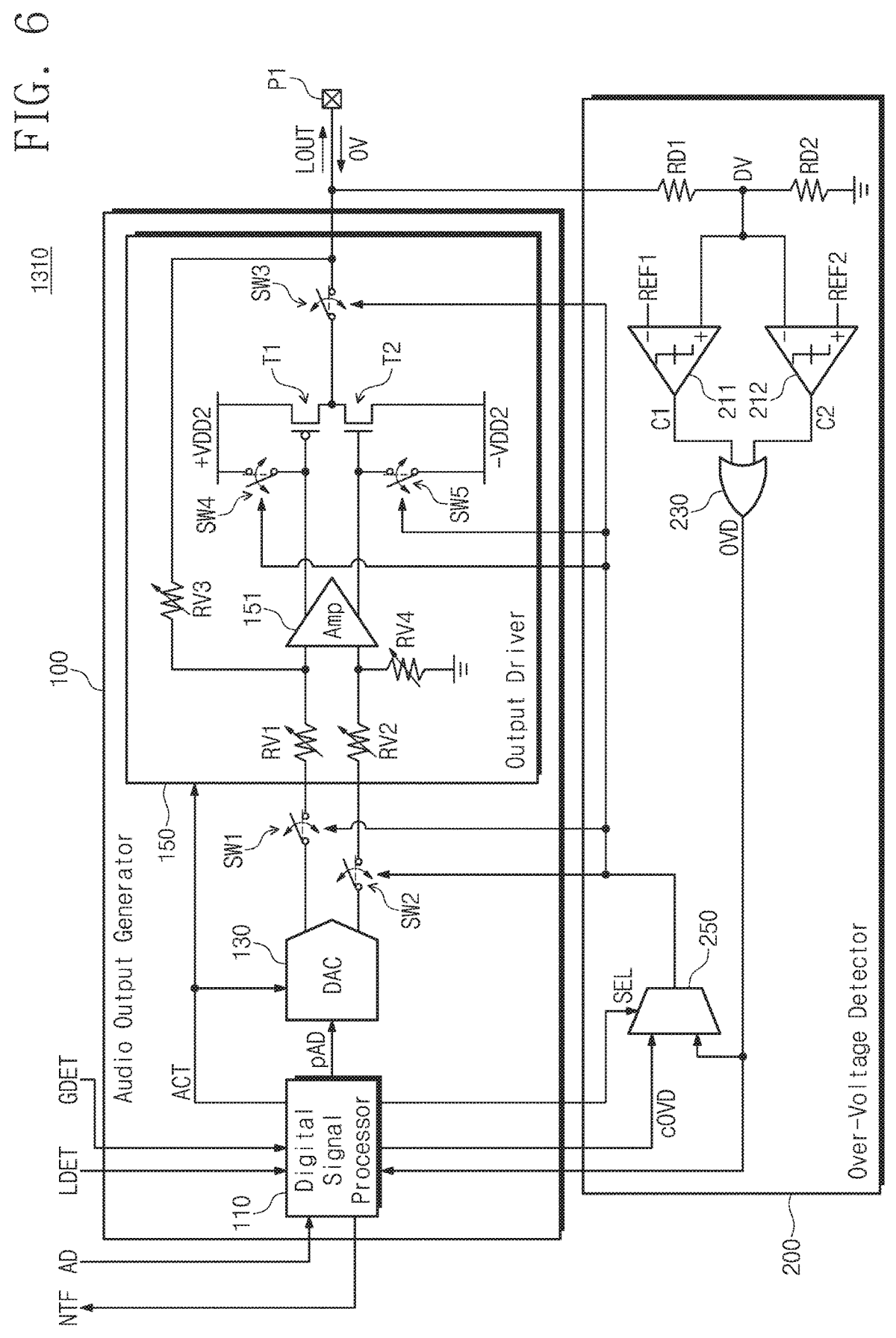

FIG. 6 is a block diagram illustrating an example configuration of the audio processor 1310 of FIG. 3. As described with reference to FIG. 3, the audio processor 1310 may include the audio output generator 100 and the overvoltage detector 200.

In some example embodiments, the audio output generator 100 may include a digital signal processor 110, a digital-to-analog converter (DAC) 130, and an output driver 150. However, the audio output generator 100 of FIG. 6 is provided to facilitate better understanding, and is not intended to limit the present invention. A configuration of the audio output generator 100 may be variously changed or modified.

The digital signal processor 110 may be configured to process input data (e.g., audio data AD) suitably. For example, the digital signal processor 110 may be configured to perform various processing (such as oversampling, noise shaping, and/or the like) on the audio data AD. Such processing may be performed to provide sufficient samples for an output signal (e.g., the audio output signal LOUT) and/or to improve the SNR characteristic, for example.

The digital signal processor 110 may be configured to determine whether the audio jack AJ is connected to the audio terminal 1340, based on the connection signal LDET and the ground signal GDET. For example, when the audio jack AJ is connected to the audio terminal 1340, the digital signal processor 110 may be configured to output an activation signal ACT such that the DAC 130 and the output driver 150 are activated. Herein, "activation" may mean a state in which the DAC 130 and the output driver 150 operate as power is supplied to the DAC 130 and the output driver 150.

On the other hand, when the audio jack AJ is not connected to the audio terminal 1340, the digital signal processor 110 may be configured to deactivate the DAC 130 and the output driver 150. Here, "deactivation" may mean a state in which the DAC 130 and the output driver 150 do not operate without receiving power. Accordingly, the DAC 130 and the output driver 150 may be activated or deactivated according to the connection signal LDET and the ground signal GDET.

The digital signal processor 110 may be configured to generate the notification NTF. The notification NTF may include a variety of information associated with operations of the audio processor 1310 (e.g., information associated with whether the audio jack AJ is connected, or not connected, to the audio terminal 1340). In some example embodiments, the digital signal processor 110 may be configured to perform digital volume control to adjust a digital gain for the audio data AD.

The digital signal processor 110 may be configured to process the audio data AD to output processed audio data pAD. For example, the processed audio data pAD may be digital data, and the audio output signal LOUT may be an analog signal. In this case, the DAC 130 may be configured to perform digital-to-analog conversion to convert the processed audio data pAD to the audio output signal LOUT. An analog signal converted by the DAC 130 may be provided to the output driver 150 through switches SW1 and SW2.

The output driver 150 may be configured to drive an output of the audio output signal LOUT based on the analog signal received from the DAC 130. To this end, the output driver 150 may include an amplifier 151 and various elements. For example, the elements of the output driver 150 may include resistive elements RV1 to RV4, transistors T1 and T2, and switches SW3, SW4, and SW5. In some example embodiments, the output driver 150 may further include other component(s) such as a filter, for example.

The amplifier 151 may be configured to amplify a level of the analog signal. An analog gain of the amplifier 151 may vary depending on resistance values of the resistive elements RV1 to RV4. Accordingly, the amplifier 151 and the resistive elements RV1 to RV4 may be configured to provide analog volume control for the analog signal.

The output driver 150 may be configured to drive the output of the audio output signal LOUT by using the transistors T1 and T2. The transistors T1 and T2 may be configured to drive the output of the audio output signal LOUT to the output terminal P1 based on second driving voltages +VDD2 and −VDD2.

For example, the second driving voltages +VDD2 and −VDD2 may be provided from a separate voltage generator (e.g., included in the power manager 1900). For example, the transistor T1 may be a P-channel metal-oxide-semiconductor (PMOS) transistor, and the transistor T2 may be an N-channel MOS (NMOS) transistor. However, the present invention may be variously changed or modified, and is not limited to these examples.

The audio output signal LOUT may be transmitted to the output terminal P1 through the switch SW3. In the example of FIG. 6, the switches SW1, SW2, and SW3 may be on a path and configured to generate the audio output signal LOUT based on the audio data AD. The switches SW1, SW2, and SW3 may be configured to operate to provide (or not to provide) a connection to the output terminal P1.

The audio output generator 100 may include various elements such as the resistive elements RV1 to RV4, the transistors T1 and T2, and the switches SW1 to SW5. The transistors T1 and T2 and the switches SW1 to SW5 may be active elements which operate using power. For example, each of the switches SW1 to SW5 may be implemented with one or more transistors. However, the present invention is not limited to this example, and the switches SW1 to SW5 may be implemented with any elements capable of providing connectivity.

In some example embodiments, the over-voltage detector 200 may include first and second resistive elements RD1 and RD2, first and second comparators 211 and 212, and a logic circuit 230. However, the over-voltage detector 200 of FIG. 6 is provided to facilitate better understanding, and is not intended to limit the present invention. A configuration of the over-voltage detector 200 may be variously changed or modified.

In some cases, an over-voltage OV may be applied through the output terminal P1. The over-voltage detector 200 may be employed to prevent the elements of the audio output generator 100 from being damaged by the over-voltage OV. To this end, the over-voltage detector 200 may be connected to the output terminal P1.

The first and second resistive elements RD1 and RD2 may be configured to divide a voltage of the output terminal P1, and thus may be configured to output a divided voltage DV. The first comparator 211 may be configured to compare the divided voltage DV with a first reference voltage REF1 to output a first comparison result C1. The second comparator 212 may be configured to compare the divided voltage DV with a second reference voltage REF2 to output a second comparison result C2. For example, the first and second reference voltages REF1 and REF2 may be provided from a separate voltage generator (e.g., included in the power manager 1900).

In some cases, it is possible that the first and second comparators 211 and 212 could also be damaged by the over-voltage OV. However, even though the over-voltage OV may be excessively high to such an extent as to be able to damage the first and second comparators 211 and 212, the divided voltage DV may be lower than a voltage which could otherwise damage the first and second comparators 211 and 212. Accordingly, because the divided voltage DV is provided to the first and second comparators 211 and 212, the first and second comparators 211 and 212 may be prevented from being damaged.

Further, the divided voltage DV may decrease as a resistance value of the first resistive element RD1 increases. Accordingly, the first and second comparators 211 and 212 may be protected more stably. However, as the divided voltage DV becomes excessively low, precision of the first and second comparators 211 and 212 may be degraded. Accordingly, a ratio of resistance values of the first and second resistive elements RD1 and RD2 may be suitably selected, taking into account both protection and precision of the first and second comparators 211 and 212.

In some cases, the elements of the audio processor 1310 could be damaged by a voltage outside of an allowable range. For example, the transistor T1 could be damaged by a voltage outside of an allowable range of ±5 V (e.g., a voltage having an amplitude which is higher than an allowable amplitude of 5 V). In this example, the audio processor 1310 may be configured to operate such that a voltage higher than a positive allowable voltage of +5 V and a voltage lower than a negative allowable voltage of −5 V are not applied to the transistor T1.

The first reference voltage REF1 may be selected taking into account the positive allowable voltage, and the second reference voltage REF2 may be selected taking into account the negative allowable voltage. However, the first and second reference voltages REF1 and REF2 may not be the same as the positive and negative allowable voltages, respectively, and may be suitably scaled taking into account the ratio of the resistance values of the resistive elements RD1 and RD2.

The first comparison result C1 may indicate whether the divided voltage DV is higher than the first reference voltage REF1, and thus may be associated with whether a voltage of the output terminal P1 is higher than the positive allowable voltage. The second comparison result C2 may indicate whether the divided voltage DV is lower than the second reference voltage REF2, and thus may be associated with whether a voltage of the output terminal P1 is lower than the negative allowable voltage. That is, the first and second comparison results C1 and C2 may be associated with whether an amplitude of the over-voltage OV is greater than an allowable amplitude of the positive and negative allowable voltages, respectively.

The logic circuit 230 may be configured to generate an over-voltage detection signal OVD based on the first and second comparison results C1 and C2. For example, the logic circuit 230 may include a logical OR gate. A level of the over-voltage detection signal OVD may correspond to different levels (e.g., logic "0" or "1") depending on whether an amplitude of the over-voltage OV is greater than the allowable amplitude of the positive and negative allowable voltages. Accordingly, the over-voltage detection signal OVD may be used to differently control operations of the audio processor 1310 depending on whether a voltage of the output terminal P1 is higher than an allowable amplitude.

The over-voltage detection signal OVD may be used to control operations of the switches SW1 to SW5 and the transistors T1 and T2. In some example embodiments, the digital signal processor 110 may be configured to generate a converted over-voltage detection signal cOVD based on the over-voltage detection signal OVD. The converted over-voltage detection signal cOVD may be used to control operations of elements and components of the audio output generator 100.

In some example embodiments, the over-voltage detector 200 may include a multiplexer 250. The multiplexer 250 may, for example, be configured to selectively output the over-voltage detection signal OVD or the converted over-voltage detection signal cOVD in response to a selection signal SEL provided from the digital signal processor 110. In this example embodiment, the elements and the components of the audio output generator 100 may be controlled based on an output of the multiplexer 250.

III. Protection Against Over-Voltage

Figure 7:
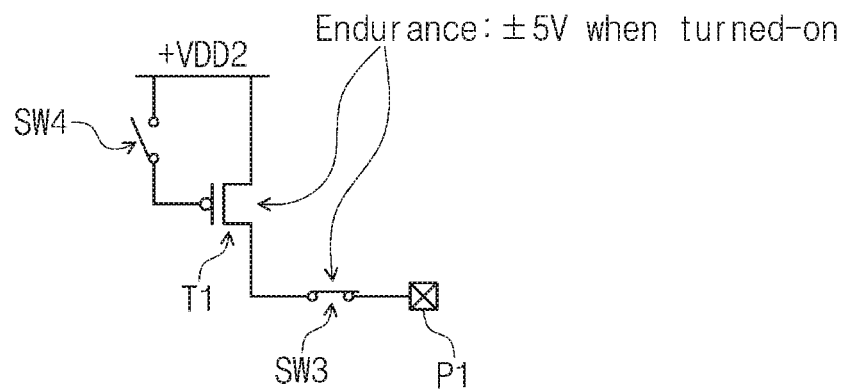
FIGS. 7 and 8 are conceptual diagrams for describing example characteristics of elements included in an audio processor of FIG. 6.
Figure 8:
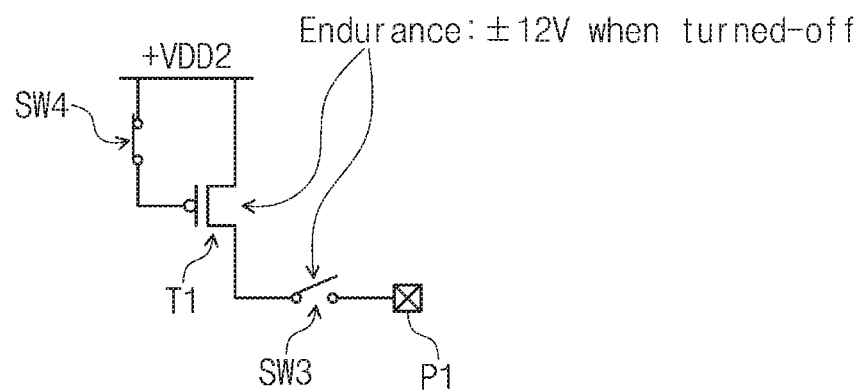

FIGS. 7 and 8 are conceptual diagrams for describing example characteristics of elements included in the audio processor 1310 of FIG. 6. For example, FIGS. 7 and 8 illustrate operations of the transistor T1 and the switches SW3 and SW4 of the audio processor 1310.

Referring to FIG. 7, while the audio processor 1310 operates normally (e.g., while the audio output generator 100 generates the audio output signal LOUT based on the audio data AD), the transistor T1 may be turned on, and the switch SW3 may be connected. Herein, "turn-on" may mean a state in which a carrier channel is formed through the transistor T1 and a current flows. For example, the switch SW3 may be implemented with one or more transistors, and the switch SW3 may be connected when the one or more transistors are turned on.

For example, when the transistor T1 and the one or more transistors of the switch SW3 are turned on, endurance of the transistor T1 and the switch SW3 may be ±5 V (e.g., the transistor T1 and the switch SW3 may be damaged by a voltage outside of an allowable range of ±5 V). In this example, when a voltage having an amplitude greater than 10 V is applied across a path including the transistor T1 and the switch SW3, the transistor T1 and the switch SW3 may be damaged.

Meanwhile, referring to FIG. 8, the transistor T1 may be turned off, and the switch SW3 may be disconnected. Herein, "turn-off" may mean a state in which a carrier channel is not formed through the transistor T1 and no current flows.

For example, when the switch SW4 is connected, a gate terminal of the transistor T1 may be connected to a drain (or source) terminal, and thus the transistor T1 may be turned off. For example, the switch SW3 may be implemented with one or more transistors, and the switch SW3 may be disconnected when the one or more transistors are turned off.

For example, when the transistor T1 and the one or more transistors of the switch SW3 are turned off, endurance of the transistor T1 and the switch SW3 may be ±12 V which is greater than ±5 V (e.g., the transistor T1 and the switch SW3 may be damaged by a voltage outside of an allowable range of ±12 V). When a carrier channel is not formed through a turned-off transistor, the turned-off transistor may endure a voltage of a greater amplitude. In this example, when a voltage having an amplitude greater than 24 V is applied across a path including the transistor T1 and the switch SW3, the transistor T1 and the switch SW3 may be damaged.

Accordingly, in the example of FIG. 7, when the over-voltage OV of +20 V is applied to the output terminal P1 while the transistor T1 and the switch SW3 are turned on, the transistor T1 and the switch SW3 may be damaged. On the other hand, in the example of FIG. 8, when the over-voltage OV of +20 V is applied to the output terminal P1 while the transistor T1 and the switch SW3 are turned off, the transistor T1 and the switch SW3 may not be damaged. Comparing FIG. 8 with FIG. 7, it may be understood that turning the elements of the audio output generator 100 off is advantageous to protect the elements of the audio output generator 100 against the over-voltage OV.

However, values of the endurance and the over-voltage OV described with reference to FIGS. 7 to 8 are provided to facilitate better understanding, and are not intended to limit the present invention. A characteristic and an operation condition of each element may be variously changed or modified depending on design and implementation of the audio output generator 100.

Figure 9:
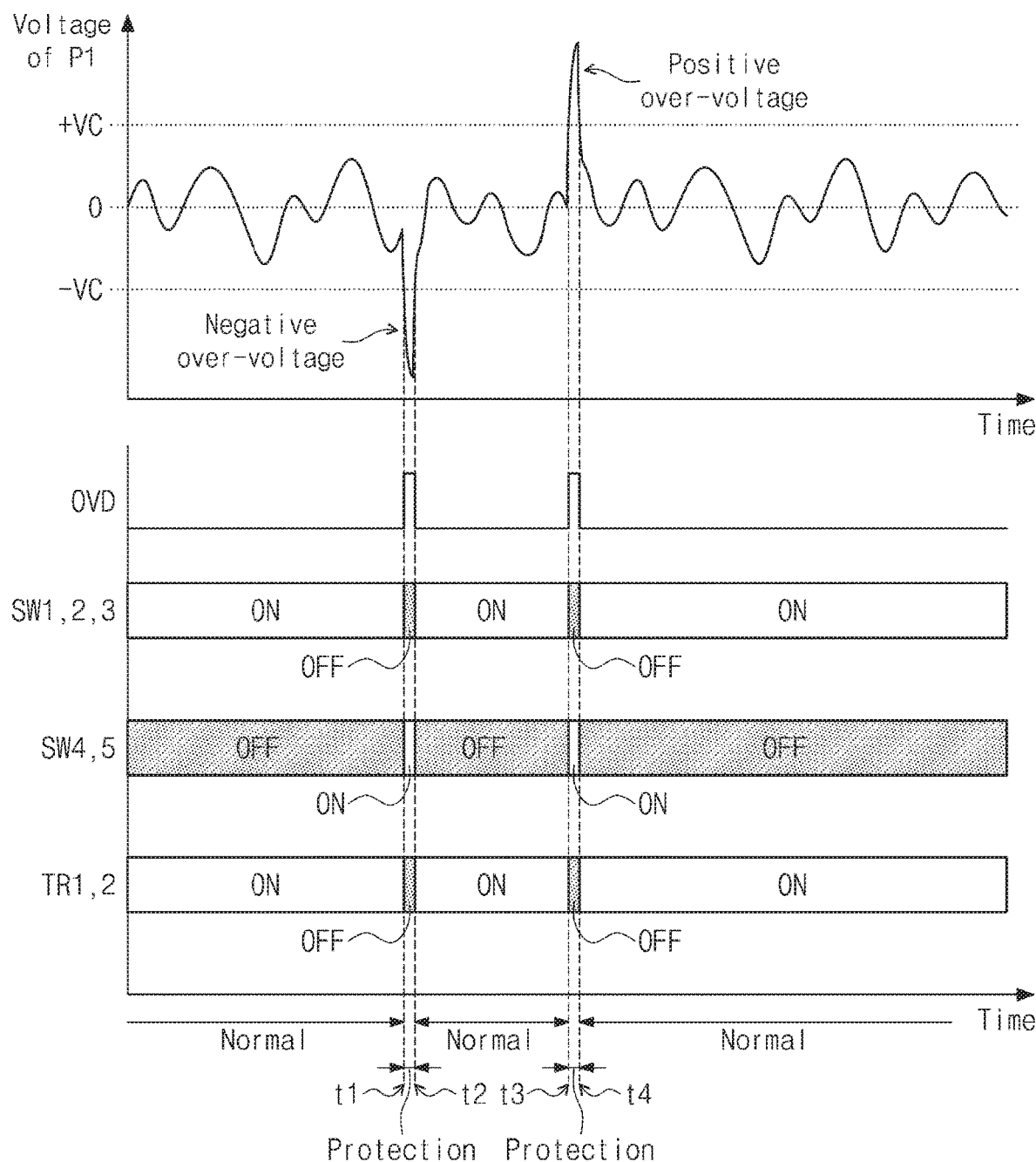
FIG. 9 is a timing diagram for describing an example operation of protecting elements included in an audio processor of FIG. 6 for protecting against an over-voltage.

FIG. 9 is a timing diagram describing an example operation of protecting elements included in the audio processor 1310 of FIG. 6 for protecting against an over-voltage.

For example, in a first normal interval before time t1, a second normal interval between time t2 and t3, and a third normal interval after time t4, a voltage of the output terminal P1 may have an amplitude within an allowable range between a positive allowable voltage +VC and a negative allowable voltage −VC. An allowable amplitude VC of the allowable voltages +VC and −VC may be selected such that the elements included in the audio output generator 100 are not damaged.

In the first, second, and third normal intervals, a level of the over-voltage detection signal OVD may correspond to the second logic value (e.g., logic "0"). The second logic value of the over-voltage detection signal OVD may indicate that the over-voltage OV does not occur.

Accordingly, the switches SW1, SW2, and SW3 may be connected (e.g., transistors of the switches SW1, SW2, and SW3 may be turned on). In addition, as the switches SW4 and SW5 are disconnected, the transistors T1 and T2 may be turned on. Therefore, the audio output generator 100 may be configured to output the audio output signal LOUT normally based on the audio data AD.

For example, as a negative over-voltage OV is applied, a voltage of the output terminal P1 may become lower than the negative allowable voltage −VC between time t1 and t2. In this case, a level of the over-voltage detection signal OVD may correspond to the first logic value (e.g., logic "1") based on the second comparison result C2.

For example, as a positive over-voltage OV is applied, a voltage of the output terminal P1 may become higher than the positive allowable voltage +VC between time t3 and t4. In this case, a level of the over-voltage detection signal OVD may correspond to the first logic value based on the first comparison result C1. The first logic value of the over-voltage detection signal OVD may indicate that the over-voltage OV occurs.

When the over-voltage OV is applied, a protection operation may be performed to protect the elements of the audio output generator 100 against the over-voltage OV. For example, the protection operation may be performed in a first protection interval between time t1 and t2 and a second protection interval between time t3 and t4.

In the first and second protection intervals, the switches SW1, SW2, and SW3 may be disconnected (e.g., transistors of the switches SW1, SW2, and SW3 may be turned off). Accordingly, the output driver 150 may be disconnected from the output terminal P1 and the DAC 130, and thus the over-voltage OV may be blocked. In addition, as the switches SW4 and SW5 are connected, the transistors T1 and T2 may be turned off. Accordingly, the transistors T1 and T2 may endure a voltage of a greater amplitude, and thus may not be damaged by the over-voltage OV.

Referring to FIG. 6, when the divided voltage DV is higher than the first reference voltage REF1 or is lower than the second reference voltage REF2, the switches SW1, SW2, and SW3 and the transistors T1 and T2 may be turned off in response to the first logic value of the over-voltage detection signal OVD. On the other hand, when the divided voltage DV is lower than the first reference voltage REF1 and is higher than the second reference voltage REF2, the switches SW1, SW2, and SW3 and the transistors T1 and T2 may be turned on in response to the second logic value of the over-voltage detection signal OVD.

When the switches SW1, SW2, and SW3 and the transistors T1 and T2 are turned off, power consumption of the audio output generator 100 may be reduced. In addition, when the switches SW1, SW2, and SW3 and the transistors T1 and T2 are turned off, the audio output signal LOUT may not be output from the audio output generator 100.

According to the example of FIG. 9, the elements of the audio output generator 100 may be protected against the over-voltage OV. However, when the over-voltage OV frequently occurs, switching of the switches SW1 to SW5 may become frequent. In this case, noise may occur, or an operation of the audio output generator 100 may become unstable.

Figure 10:
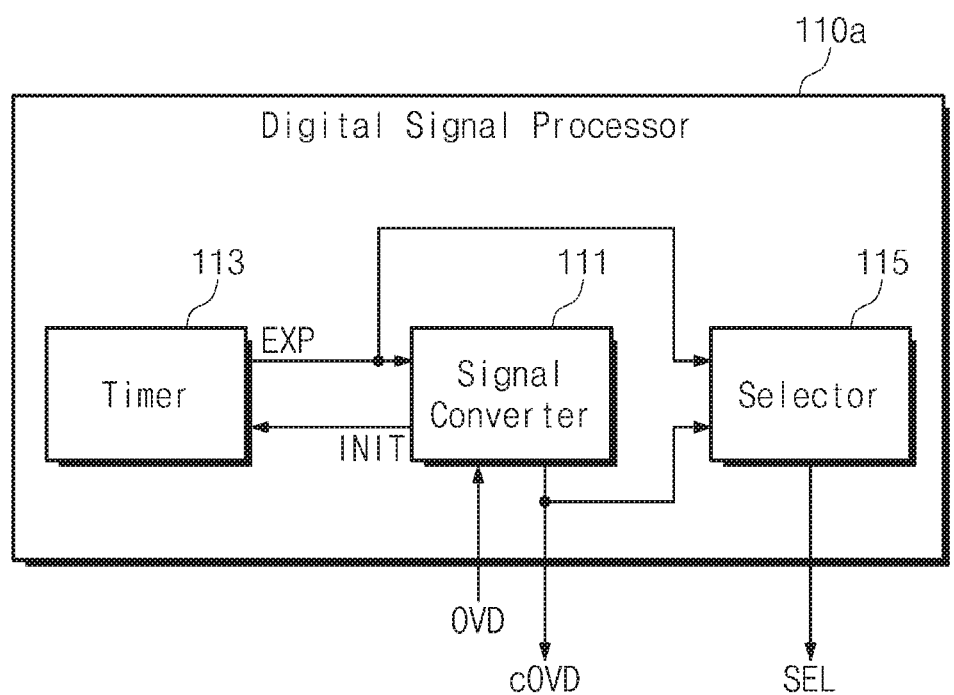
FIG. 10 is a block diagram illustrating an example configuration of a digital signal processor of FIG. 6.

FIG. 10 is a block diagram illustrating an example configuration of the digital signal processor 110 of FIG. 6. In some example embodiments, the digital signal processor 110 of FIG. 6 may include a digital signal processor 110a of FIG. 10.

The digital signal processor 110a may include a signal converter 111, a timer 113, and a selector 115. The signal converter 111, the timer 113, and the selector 115 may be implemented with analog/digital circuits including various passive/active/logic elements to provide operations and functions, which will be described below.

The signal converter 111 may be configured to convert the over-voltage detection signal OVD to output the converted over-voltage detection signal cOVD. The timer 113 may be configured to measure (or count) a lapse of a reference time RT, and to output an expiration signal EXP in response to expiration of the reference time RT. The expiration signal EXP may be output to provide a notification which indicates the reference time RT has elapsed.

The timer 113 may be initialized based on an initialization signal INIT provided from the signal converter 111. Herein, "initialization" of the timer 113 may mean that the reference time RT is again measured from an initial time point without considering an already-passed time. When the timer 113 completely measures the reference time RT without initialization, the signal converter 111 may be configured to determine that the reference time RT has elapsed based on the expiration signal EXP.

The selector 115 may be configured to output the selection signal SEL. For example, the selection signal SEL may be generated based on the converted over-voltage detection signal cOVD and the expiration signal EXP. The selection signal SEL may be used to select an output of the multiplexer 250 of FIG. 6 from among the over-voltage detection signal OVD and the converted over-voltage detection signal cOVD.

As will be described below, based on the selection signal SEL, the over-voltage detection signal OVD or the converted over-voltage detection signal cOVD may selectively be involved in turn-on and turn-off of the switches SW1, SW2, and SW3 and transistors TR1 and TR2. The switches SW1, SW2, and SW3 and transistors TR1 and TR2 may be turned on or turned off in response to the output of the multiplexer 250.

Figure 11:
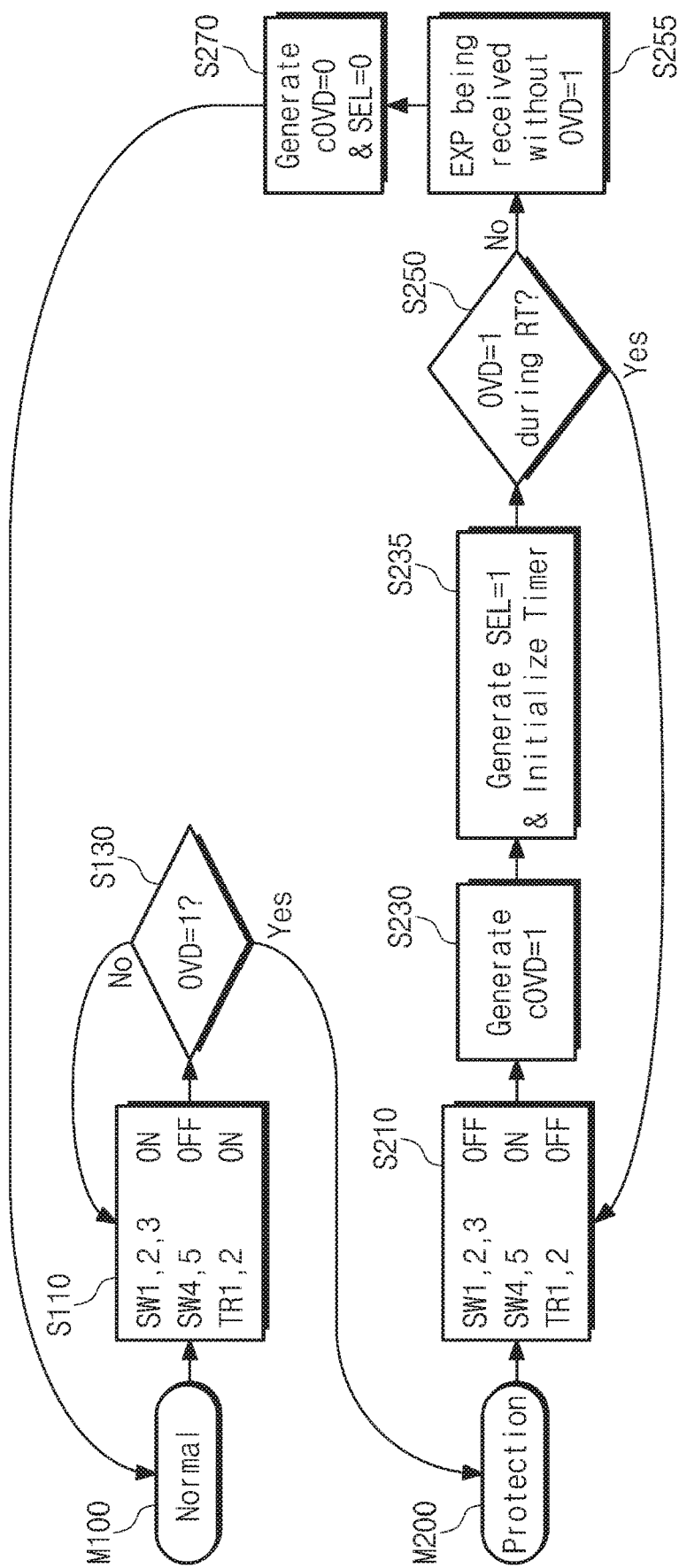
FIG. 11 is a state diagram describing an example operation of protecting elements included in an audio processor of FIG. 6 for protecting against an over-voltage.
Figure 12:
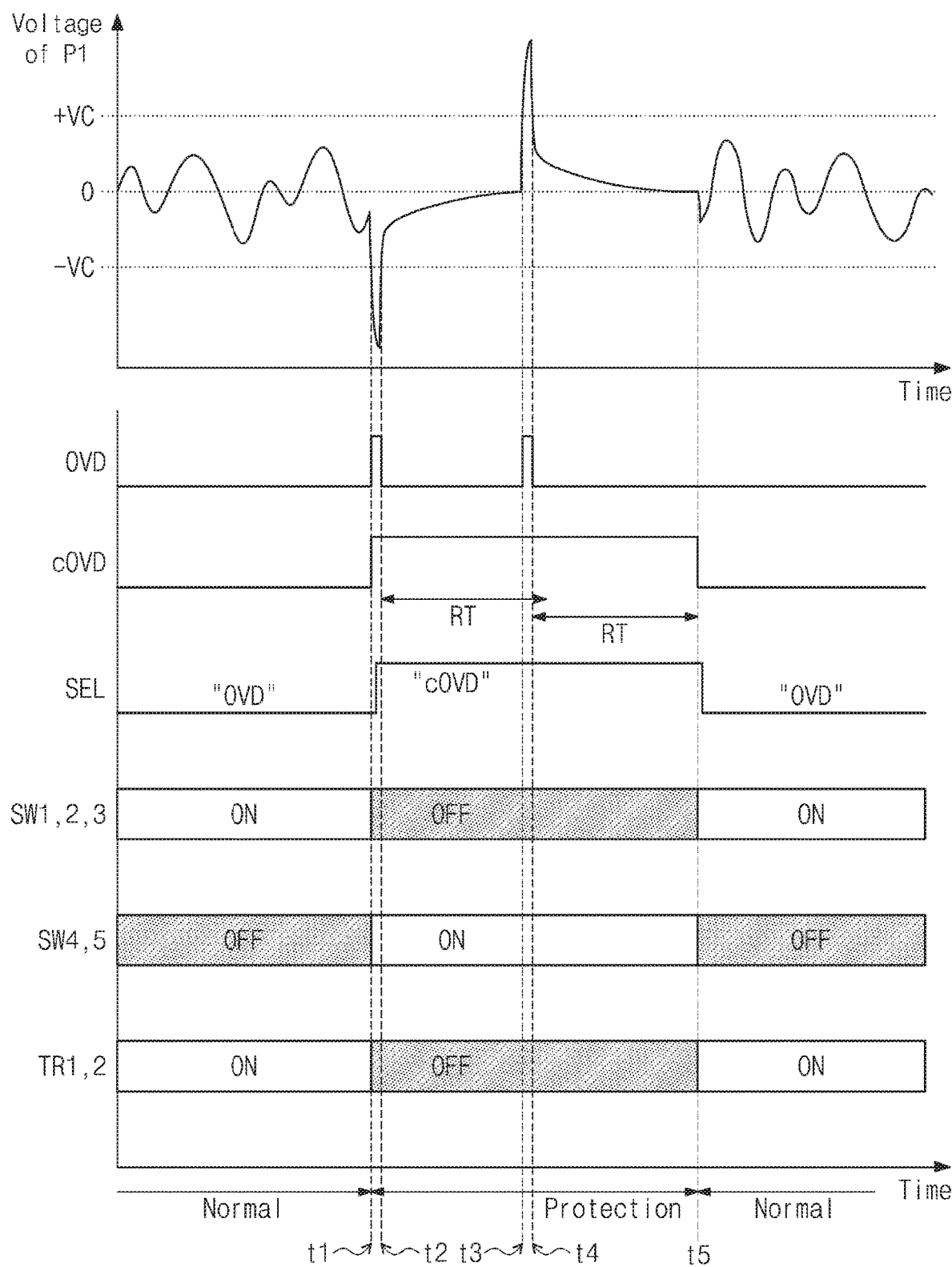
FIG. 12 is a timing diagram for describing an example operation of protecting elements included in an audio processor of FIG. 6 for protecting against an over-voltage.

FIG. 11 is a state diagram describing an example operation of protecting elements included in the audio processor 1310 of FIG. 6 for protecting against an over-voltage. FIG. 12 is a timing diagram describing an example operation of protecting elements included in the audio processor 1310 of FIG. 6 for protecting against an over-voltage.

Referring to FIG. 11, when the over-voltage OV does not occur, the audio processor 1310 may operate in a normal interval M100. Referring to FIG. 12, in the normal interval M100 before time t1, a voltage of the output terminal P1 may have an amplitude within an allowable range between the positive allowable voltage +VC and the negative allowable voltage −VC.

In the normal interval M100, the switches SW1, SW2, and SW3 may be connected (e.g., transistors of the switches SW1, SW2, and SW3 may be turned on), and the transistors T1 and T2 may be turned on as the switches SW4 and SW5 are disconnected (S110 of FIG. 11). Accordingly, the audio output generator 100 may be configured to output the audio output signal LOUT normally based on the audio data AD.

In addition, in the normal interval M100, a level of the over-voltage detection signal OVD may correspond to the second logic value (e.g., logic "0").

In the normal interval M100, a level of the selection signal SEL may correspond to the second logic value (e.g., logic "0"). The multiplexer 250 of FIG. 6 may output the over-voltage detection signal OVD in response to the second logic value of the selection signal SEL. The switches SW1, SW2, and SW3 and the transistors T1 and T2 may be turned on in response to the second logic value of the over-voltage detection signal OVD.

Referring to FIG. 11, when the over-voltage detection signal OVD maintains the second logic value ("No" of S130), the switches SW1 to SW5 and the transistors TR1 and TR2 may remain in their current states. On the other hand, when the second logic value of the over-voltage detection signal OVD changes to the first logic value (e.g., logic "1") ("Yes" of S130), a protection interval M200 may be entered. The first logic value of the over-voltage detection signal OVD may indicate that the over-voltage OV is applied through the output terminal P1.

Referring to FIG. 12, at time t1, a voltage of the output terminal P1 may become lower than the negative allowable voltage −VC (i.e., an amplitude of a voltage of the output terminal P1 may become greater than the allowable amplitude VC). While the voltage of the output terminal P1 is lower than the negative allowable voltage −VC between time t1 and t2, the level of the over-voltage detection signal OVD may correspond to the first logic value.

The over-voltage detection signal OVD of the first logic value may be provided to the audio output generator 100. The switches SW1, SW2, and SW3 and the transistors TR1 and TR2 may be turned off in response to the first logic value of the over-voltage detection signal OVD, and the switches SW4 and SW5 may be connected in response to the first logic value of the over-voltage detection signal OVD to turn off the transistors TR1 and TR2 (S210 of FIG. 11).

The audio output generator 100 may be configured to generate the converted over-voltage detection signal cOVD of the first logic value (e.g., logic "1") based on the over-voltage detection signal OVD of the first logic value (S230 of FIG. 11). For example, the signal converter 111 of FIG. 10 may be configured to convert the over-voltage detection signal OVD to output the converted over-voltage detection signal cOVD.

Once the switches SW1, SW2, and SW3 and the transistors TR1 and TR2 are turned off in response to the first logic value of the over-voltage detection signal OVD, the selector 115 of FIG. 10 may be configured to change a logic value of the selection signal SEL from the second logic value to the first logic value (e.g., logic "1") (S235 of FIG. 11). In some cases, there may be a relatively short delay between the converted over-voltage detection signal cOVD and the selection signal SEL. The multiplexer 250 of FIG. 6 may be configured to output the converted over-voltage detection signal cOVD in response to the first logic value of the selection signal SEL.

After the logic value of the selection signal SEL is changed, the switches SW1, SW2, and SW3 and the transistors TR1 and TR2 may remain turned off in response to the first logic value of the converted over-voltage detection signal cOVD. The initial turn-off of the switches SW1, SW2, and SW3 and the transistors TR1 and TR2 may be controlled based on the over-voltage detection signal OVD, and the following control of the switches SW1, SW2, and SW3 and the transistors TR1 and TR2 may be performed based on the converted over-voltage detection signal cOVD.

At time t2, a voltage of the output terminal P1 may become higher than the negative allowable voltage −VC (e.g., as the over-voltage OV is resolved, an amplitude of the voltage of the output terminal P1 may become smaller than the allowable amplitude VC). Accordingly, at time t2, the first logic value of the over-voltage detection signal OVD may change to the second logic value.

However, during at least the reference time RT after time t2, the converted over-voltage detection signal cOVD may maintain the first logic value. Accordingly, the switches SW1, SW2, and SW3 and the transistors TR1 and TR2 may remain turned off in response to the first logic value of the converted over-voltage detection signal OVD, at least until the reference time RT elapses.

The timer 113 of FIG. 10 may be initialized in response to the initialization signal INIT to measure the reference time RT (S235 of FIG. 11). For example, the timer 113 may be initialized when the first logic value of the over-voltage detection signal OVD changes to the second logic value. Accordingly, the reference time RT may be measured from a time point when the over-voltage OV is resolved.

As described above, when the over-voltage OV frequently occurs, switching of the switches SW1 to SW5 may become frequent. Accordingly, to operate the audio output generator 100 stably, the elements of the audio output generator 100 may remain in their current states at least during the reference RT. The reference time RT may be variously selected taking into account an operation condition, stability, and/or the like, of the audio output generator 100.

In some cases, the over-voltage OV may be applied through the output terminal P1 again before the reference time RT elapses. For example, at time t3 within the reference time RT from time t2, a voltage of the output terminal P1 may become higher than the positive allowable voltage +VC (i.e., an amplitude of a voltage of the output terminal P1 may become greater than the allowable amplitude VC).

Accordingly, at time t3, the second logic value of the over-voltage detection signal OVD may change to the first logic value. While the voltage of the output terminal P1 is higher than the positive allowable voltage +VC between time t3 and t4, the over-voltage detector 200 may be configured to output the over-voltage detection signal OVD of the first logic value.

When the audio output generator 100 receives the over-voltage detection signal OVD of the first logic value again before the reference time RT elapses ("Yes" of S250 of FIG. 11), the audio output generator 100 may be configured to maintain the first logic value of the converted over-voltage detection signal cOVD. Accordingly, the switches SW1, SW2, and SW3 and the transistors T1 and T2 may continue to remain turned off, and the first logic value of the selection signal SEL may be maintained.

Afterwards, at time t4, a voltage of the output terminal P1 may become lower than the positive allowable voltage +VC (i.e., an amplitude of a voltage of the output terminal P1 may become smaller than the allowable amplitude VC). Accordingly, at time t4, the first logic value of the over-voltage detection signal OVD may change to the second logic value. Further, the timer 113 may be initialized, and may be configured to measure the reference time RT again from time t4.

In some cases, the over-voltage OV may not occur until after the reference time RT elapses. For example, until time t5 after the reference time RT from time t4, a voltage of the output terminal P1 may have an amplitude within the allowable range (i.e., an amplitude of a voltage of the output terminal P1 may be smaller than the allowable amplitude VC). Accordingly, the over-voltage detector 200 may be configured to output the over-voltage detection signal OVD of the second logic value during the reference time RT (e.g., the second logic value of the over-voltage detection signal OVD may be maintained during the reference time RT), and the audio output generator 100 may not receive the over-voltage detection signal OVD of the first logic value from the over-voltage detector 200 ("No" of S250 of FIG. 11).

In this case, the timer 113 may be configured to output the expiration signal EXP (S255 of FIG. 11). The expiration signal EXP may include a notification indicating that the reference time RT has elapsed. When the expiration signal EXP is generated without the over-voltage detection signal OVD of the first logic value, this may mean it is likely that the over-voltage OV will not occur again within a relatively short time.

Accordingly, the audio output generator 100 may be configured to change a logic value of the converted over-voltage detection signal cOVD from the first logic value to the second logic value (e.g., logic "0") in response to the notification of the expiration signal EXP (S270 of FIG. 11). At time t5, the normal interval M100 may be entered in response to the second logic value of the converted over-voltage detection signal cOVD. An interval between time t2 and t5 may be provided as the protection interval M200.

In the entered normal interval M100, the switches SW1, SW2, and SW3 may be connected in response to the second logic value of the converted over-voltage detection signal cOVD (e.g., transistors of the switches SW1, SW2, and SW3 may be turned on). In addition, as the switches SW4 and SW5 are disconnected in response to the second logic value of the converted over-voltage detection signal cOVD, the transistors T1 and T2 may be turned on.

The first logic value of the selection signal SEL may change to the second logic value, based on the expiration signal EXP and/or the second logic value of the converted over-voltage detection signal cOVD. The multiplexer 250 of FIG. 6 may be configured to output the over-voltage detection signal OVD of the second logic value in response to the second logic value of the selection signal SEL. Accordingly, when the over-voltage OV occurs after time t5, the protection interval M200 may be entered based on the first logic value of the over-voltage detection signal OVD.

In the example of FIG. 12, when the switches SW1, SW2, and SW3 and the transistors T1 and T2 are turned on, the over-voltage detection signal OVD may be selected based on the selection signal SEL so as to be involved in turn-off of the switches SW1, SW2, and SW3 and the transistors T1 and T2. Accordingly, the switches SW1, SW2, and SW3 and the transistors T1 and T2 may be turned off in response to the first logic value of the over-voltage detection signal OVD for protection against the over-voltage OV.

In addition, when the switches SW1, SW2, and SW3 and the transistors T1 and T2 are turned off, the converted over-voltage detection signal cOVD may be selected based on the selection signal SEL so as to be involved in turn-on of the switches SW1, SW2, and SW3 and the transistors T1 and T2. When the over-voltage OV is resolved, the switches SW1, SW2, and SW3 and the transistors T1 and T2 may be turned on in response to the second logic value of the converted over-voltage detection signal cOVD.

According to the above example embodiments, the elements of the audio processor 1310 may be prevented from being damaged by the over-voltage OV. Accordingly, reliability and stability of the audio processor 1310 and the electronic device 1000 may be obtained. Even though a fewer number of protection elements (e.g., the diodes DL and DR, the beads BL and BR, and/or the like, of FIG. 3) are used, the over-voltage detector 200 according to the above example embodiments may be configured to provide sufficient protection against the over-voltage OV. Accordingly, manufacturing costs of the surge attenuation circuits SAL and SAR and the electronic device 1000 may be reduced.

Meanwhile, in the protection interval M200 between time t2 and t5, the audio output signal LOUT may not be output. In this case, the user may not listen to the audio suddenly.

In some example embodiments, when the switches SW1, SW2, and SW3 and the transistors T1 and T2 are turned off, the audio output generator 100 may be configured to provide the main processor 1800 with the notification NTF or an interrupt signal with regard to turn-off of the switches SW1, SW2, and SW3 and the transistors T1 and T2. The notification NTF or the interrupt signal may be generated based on the over-voltage detection signal OVD or the converted over-voltage detection signal cOVD.

The main processor 1800 may be configured to operate to inform the user of occurrence of the over-voltage OV and performance of the protection operation, based on the notification NTF or the interrupt signal. For example, the main processor 1800 may be configured to provide the user interface 1600 with information associated with the notification NTF or the interrupt signal. For example, a display device may be configured to display a message associated with occurrence of the over-voltage OV and performance of the protection operation, such that the user may be informed of the occurrence of the over-voltage OV and the performance of the protection operation from the message.

IV. Prevention of Noise

Figure 13:
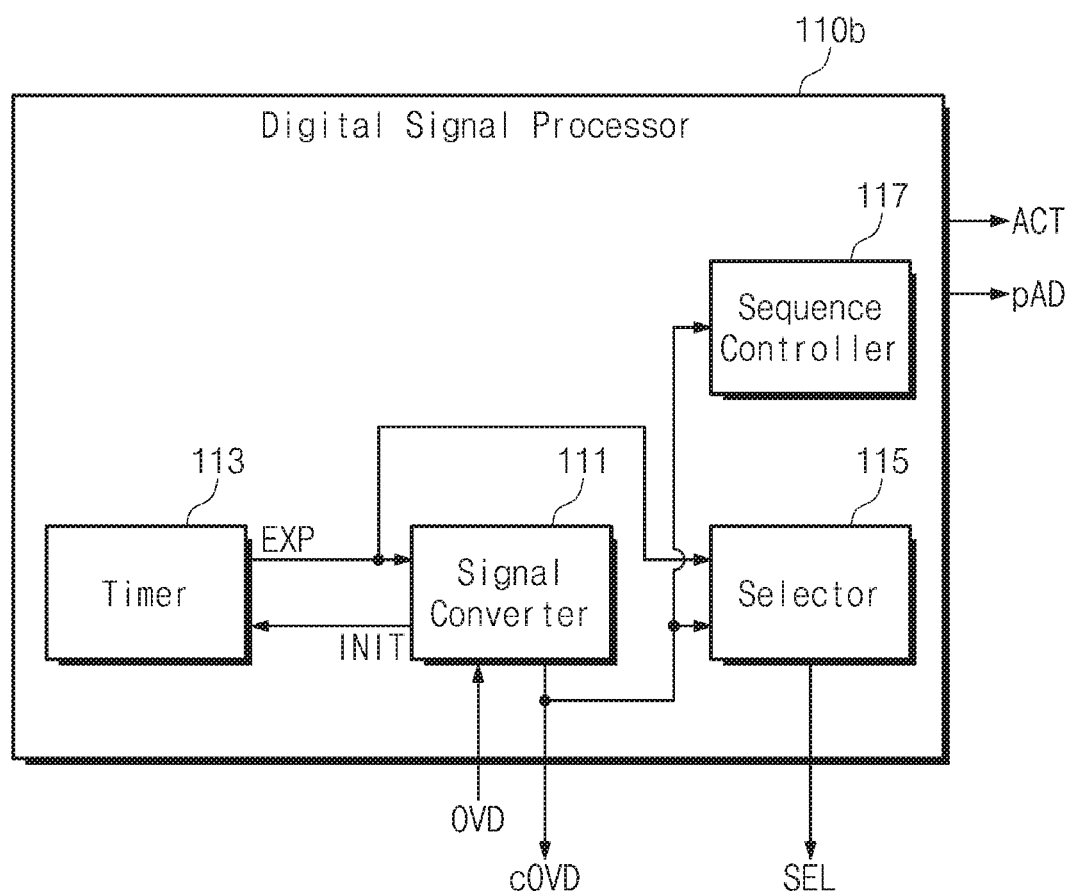
FIG. 13 is a block diagram illustrating an example configuration of a digital signal processor of FIG. 6.

FIG. 13 is a block diagram illustrating an example configuration of the digital signal processor 110 of FIG. 6. In some example embodiments, the digital signal processor 110 of FIG. 6 may include a digital signal processor 110b of FIG. 13.

The digital signal processor 110b may include the signal converter 111, the timer 113, the selector 115, and a sequence controller 117. The signal converter 111, the timer 113, and the selector 115 have been described with reference to FIGS. 10 to 13. The sequence controller 117 may be implemented with analog/digital circuits including various passive/active/logic elements to provide operations and functions, which will be described below.

The sequence controller 117 may be configured to control and manage sequences progressing in the audio processor 1310 during overall processes of the normal interval M100 and the protection interval M200. Example sequences progressing in the audio processor 1310 will be described with reference to FIG. 14.

Figure 14:
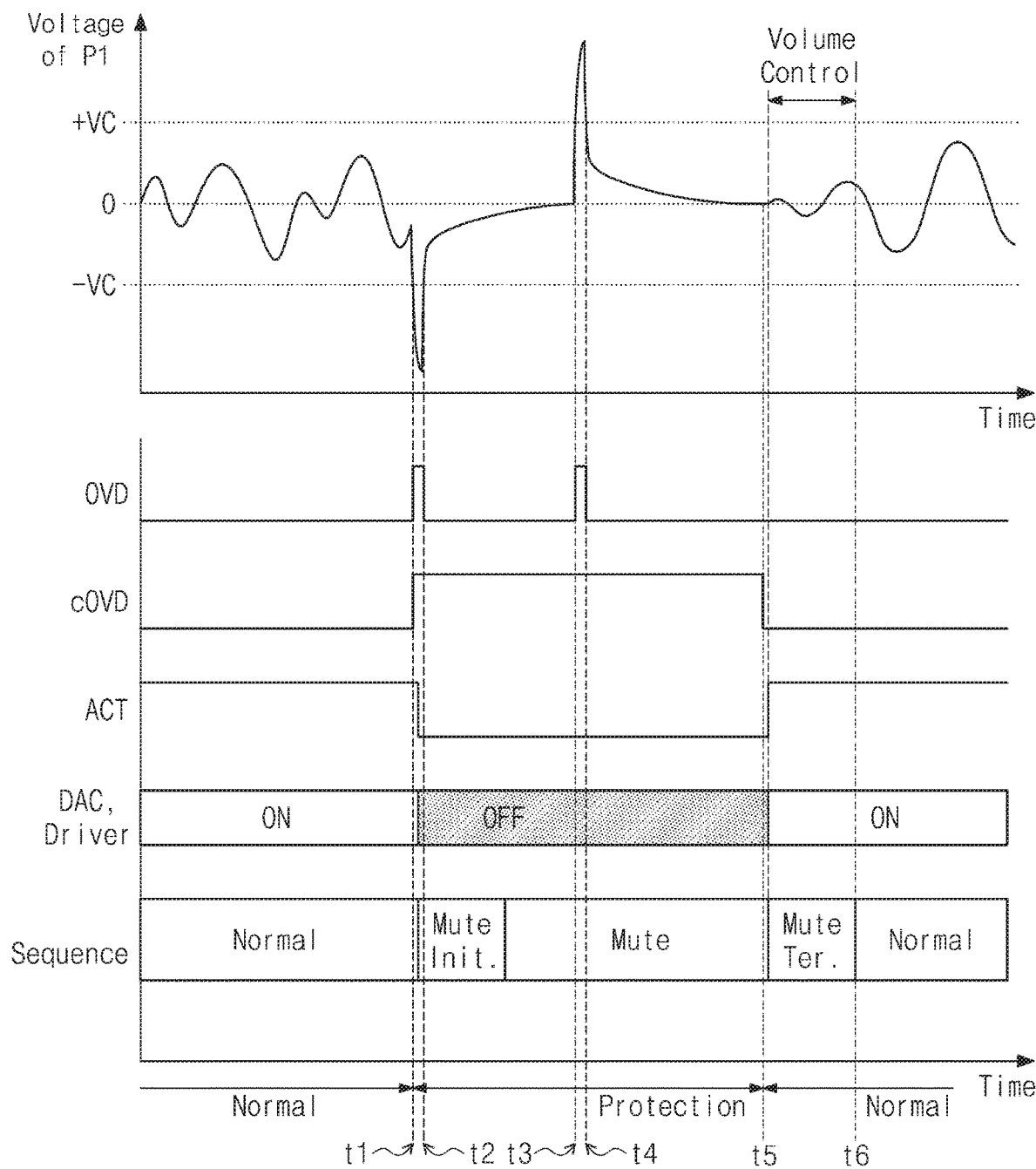
FIG. 14 is a timing diagram for describing an example operation of preventing noise which may be noticeable by a user in an audio processor of FIG. 6.

FIG. 14 is a timing diagram describing an example operation of preventing noise which may be noticeable by the user in the audio processor 1310 of FIG. 6.

In the normal interval M100 before time t1, the digital signal processor 110b may output the activation signal ACT of the first logic value (e.g., logic "1"). The DAC 130 and the output driver 150 may be activated in response to the first logic value of the activation signal ACT. During the normal interval M100, the sequence controller 117 of FIG. 13 may be configured to manage a normal sequence. The normal sequence may be managed such that the DAC 130 and the output driver 150 are activated and the audio output signal LOUT is normally output based on the audio data AD.

As the over-voltage OV occurs at time t1, the protection interval M200 may be entered. In addition, the first logic value of the activation signal ACT may change to the second logic value (e.g., logic "0"). For example, the logic value of the activation signal ACT may be changed based on the over-voltage detection signal OVD and/or the converted over-voltage detection signal cOVD. In some cases, there may be a relatively short delay between the over-voltage detection signal OVD (or the converted over-voltage detection signal cOVD) and the activation signal ACT.

The DAC 130 and the output driver 150 may be deactivated in response to the second logic value of the activation signal ACT. In the protection interval M200, the elements of the audio output generator 100 may be turned off, and thus the audio output signal LOUT may not be output. Therefore, deactivating the DAC 130 and the output driver 150 may be advantageous to reduce power consumption.

At a time point when the protection interval M200 is entered, the sequence controller 117 may be configured to manage a mute initiation sequence. For example, the sequence controller 117 may be configured to execute the mute initiation sequence in response to the first logic value of the converted over-voltage detection signal cOVD. The mute initiation sequence may be managed such that the DAC 130 and the output driver 150 are ready to be deactivated and power consumption is reduced.

The sequence controller 117 may be configured to manage a mute sequence in response to the DAC 130 and the output driver 150 being deactivated. The mute sequence may be managed such that the DAC 130 and the output driver 150 are deactivated and the audio output signal LOUT is not output.

As the protection interval M200 terminates at time t5, the normal interval M100 may be entered. In addition, the second logic value of the activation signal ACT may change to the first logic value. The DAC 130 and the output driver 150 may be activated in response to the first logic value of the activation signal ACT. The elements of the audio output generator 100 may be turned on, and thus the audio output signal LOUT may be output from the audio output generator 100.

At a time point when the normal interval M100 is entered, the sequence controller 117 may be configured to manage a mute termination sequence. For example, the sequence controller 117 may be configured to execute the mute termination sequence in response to the second logic value of the converted over-voltage detection signal cOVD. The mute termination sequence may be managed such that a gain for the audio output signal LOUT slowly increases. For example, the gain may be a digital gain provided by the digital signal processor 110b and/or an analog gain provided by the output driver 150.

For example, if the audio output signal LOUT is suddenly output as soon as the elements of the audio output generator 100 are turned on after the protection interval M200 terminates, the user may hear a "pop noise" which sounds as if something pops. If the pop noise is noticed by the user, satisfaction of the user may be degraded.

However, because the gain slowly increases under control of the sequence controller 117 ("volume control"), a smooth transition from the mute sequence of the protection interval M200 to the mute termination sequence of the normal interval M100 may be provided. In this case, the pop noise may not occur. Accordingly, occurrence of the pop noise which may be noticeable by the user may be prevented, and satisfaction of the user may be improved. The normal sequence may then be provided after the mute termination sequence.

In the mute termination sequence, the gain for the audio output signal LOUT may be controlled to slowly increase according to a reference ratio for a time, during a control time (e.g., a time from time t5 to t6) after the elements of the audio output generator 100 are turned on. For example, the reference ratio for the time may be selected as 3 dBFS per 0.1 second, 10 dBFS per 0.5 seconds, or the like. However, these values are provided to facilitate better understanding, and are not intended to limit the present invention. The reference ratio for the time may be fixed or variable, and may be variously changed or modified such that the pop noise does not occur.

For example, at a time point when the mute termination sequence starts, the gain may be initially set to negative infinity ($-\infty$). The gain of negative infinity ($-\infty$) may be, for example, a gain configured to make a signal level be zero (0) or almost zero. In this example, after the elements of the audio output generator 100 are turned on, the gain may slowly increase from negative infinity ($-\infty$). The gain may slowly increase according to the reference ratio during the control time, such that an intensity of the audio output signal LOUT reaches an intended (or desired) intensity indicated based on the audio data AD. For example, the processed audio signal pAD may be output based on the gain controlled in the mute termination sequence.

V. Prevention of Misoperation

Figure 15:
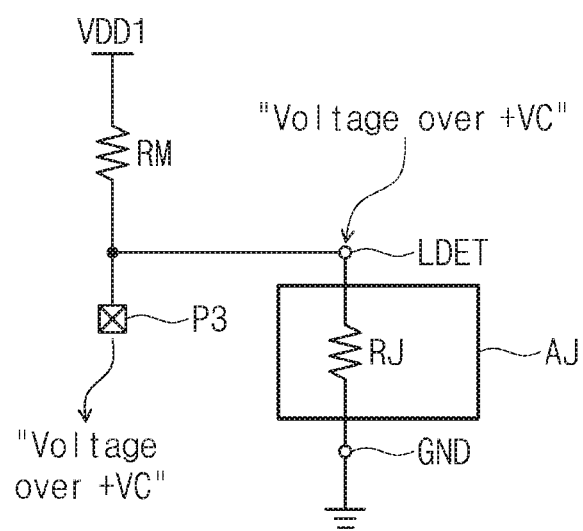
FIG. 15 is a conceptual diagram illustrating an example configuration associated with a connection signal of FIG. 3.

FIG. 15 is a conceptual diagram illustrating an example configuration associated with the connection signal LDET of FIG. 3.

As described with reference to FIG. 5, when the audio jack AJ is connected to the audio terminal 1340, the contact associated with the connection signal LDET may be connected to the ground contact GND through the audio jack AJ. In this case, a level of the connection signal LDET may be pulled down to a ground level, and the audio output generator 100 may be configured to recognize connection of the audio jack AJ based on the second logic value (e.g., logic "0") of the connection signal LDET.

However, in some cases, a positive over-voltage may be applied through the audio terminal 1340. In these cases, referring to FIG. 15, a voltage of the contact associated with the connection signal LDET may become higher than the positive allowable voltage +VC. Accordingly, a level of the connection signal LDET may increase so as to correspond to the first logic level (e.g., logic "1").

As described with reference to FIG. 4, the audio output generator 100 may be configured to determine that the audio jack AJ is not connected to the audio terminal 1340, based on the first logic level of the connection signal LDET. That is, when a positive over-voltage is applied through the audio terminal 1340, the audio output generator 100 may be configured to recognize that the audio jack AJ is absent even though the audio jack AJ is actually connected to the audio terminal 1340.

Accordingly, in such a case, the digital signal processor 110 may be configured to deactivate the DAC 130 and the output driver 150, and the audio output signal LOUT may not be output even though the audio jack AJ is connected to the audio terminal 1340. As such, a positive over-voltage may cause an unintended misoperation.

Figures 16, 17:
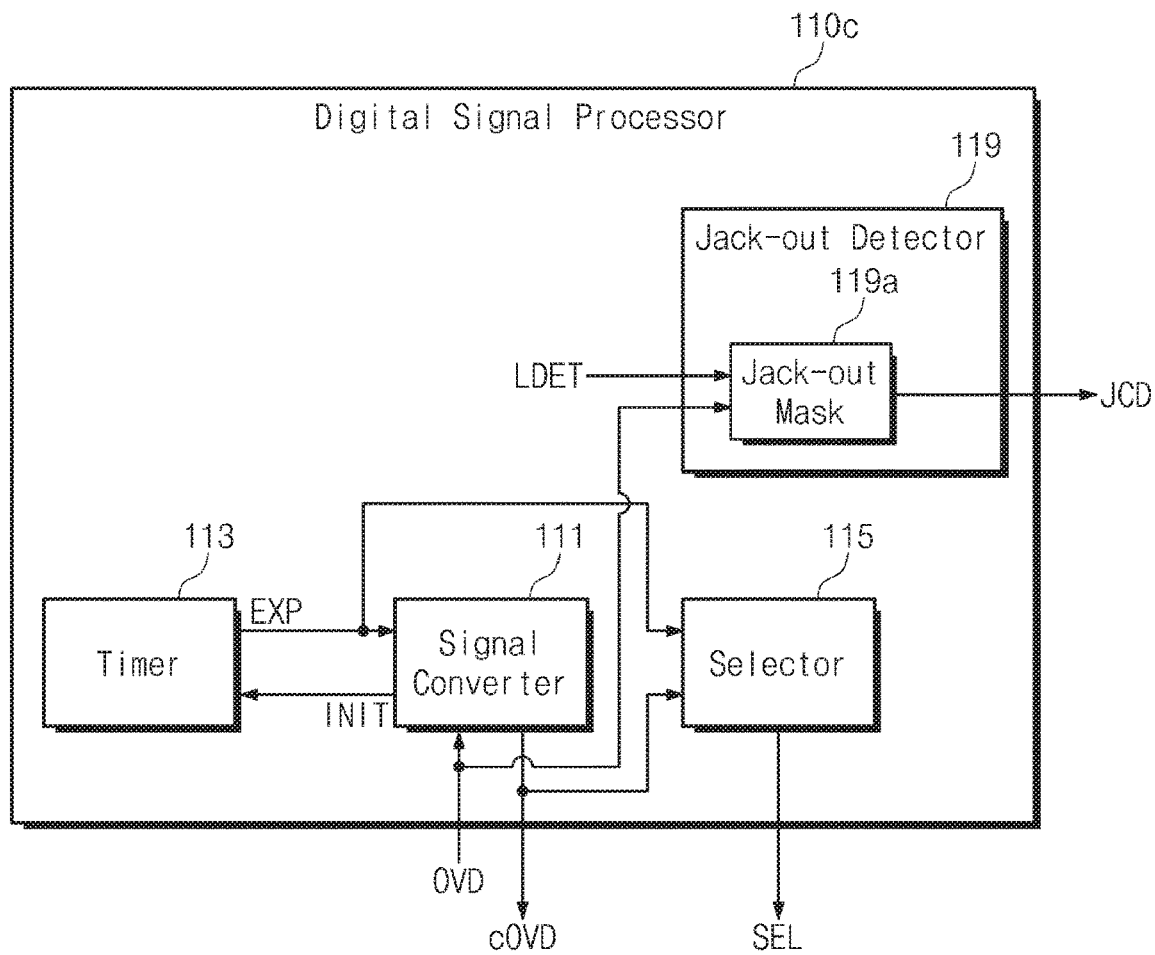
FIG. 16 is a block diagram illustrating an example configuration of a digital signal processor of FIG. 6.
FIG. 17 is a table describing example signals dealt with by a jack-out mask circuit of FIG. 16.

FIG. 16 is a block diagram illustrating an example configuration of the digital signal processor 110 of FIG. 6. In some example embodiments, the digital signal processor 110 of FIG. 6 may include a digital signal processor 110c of FIG. 16.

The digital signal processor 110c may include the signal converter 111, the timer 113, the selector 115, and a jack-out detector 119. The signal converter 111, the timer 113, and the selector 115 have been described with reference to FIGS. 10 to 13. The jack-out detector 119 may be implemented with analog/digital circuits including various passive/active/logic elements to provide operations and functions, which will be described below.

The jack-out detector 119 may be configured to determine whether the audio jack AJ is connected to the audio terminal 1340, based on the connection signal LDET. In addition, the jack-out detector 119 may include a jack-out mask circuit 119a.

The jack-out mask circuit 119a may be configured to receive the connection signal LDET and the over-voltage detection signal OVD. The jack-out mask circuit 119a may be configured to provide masking of the connection signal LDET to prevent a misoperation due to a positive over-voltage. The jack-out mask circuit 119a may be configured to output a jack connection detection signal JCD as a result of the masking. Herein, "masking" may mean an operation or control for hiding or cancelling a specific event to prevent an unintended situation.

Figure 18:
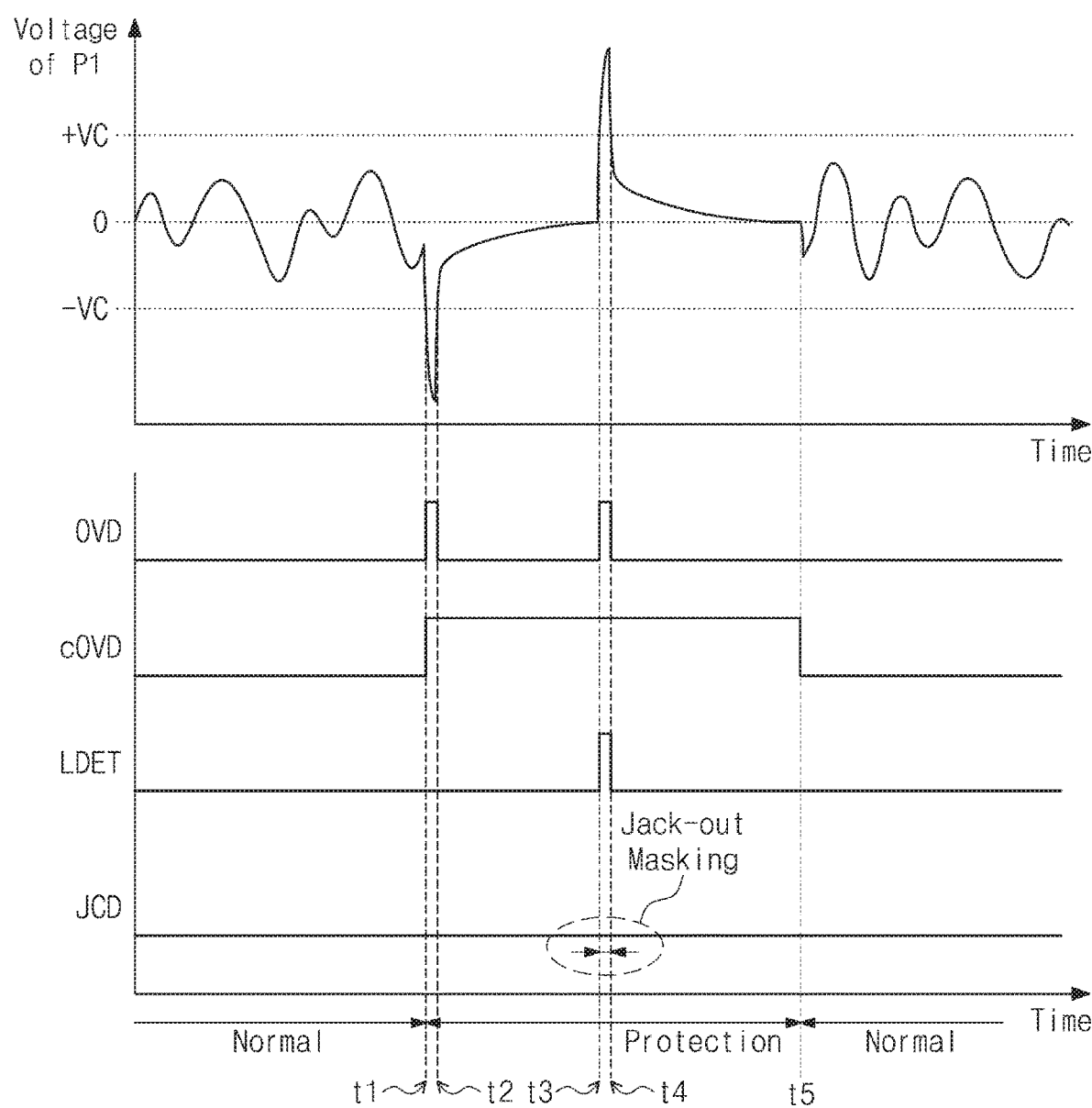
FIG. 18 is a timing diagram describing an example operation of preventing a misoperation due to an over-voltage in an audio processor of FIG. 6.

FIG. 17 is a table describing example signals dealt with by the jack-out mask circuit 119a of FIG. 16. FIG. 18 is a timing diagram describing an example operation of preventing a misoperation due to an over-voltage in the audio processor 1310 of FIG. 6.

FIG. 17 illustrates logic values of the over-voltage detection signal OVD and the connection signal LDET input to the jack-out mask circuit 119a and the jack connection detection signal JCD output from the jack-out mask circuit 119a. The first logic value (e.g., logic "1") of the connection signal LDET may indicate that the audio jack AJ is not connected to the audio terminal 1340. The second logic value (e.g., logic "0") of the connection signal LDET may indicate that the audio jack AJ is connected to the audio terminal 1340.

When an over-voltage does not occur, a level of the over-voltage detection signal OVD may correspond to the second logic value (e.g., logic "0"), and the elements of the audio output generator 100 may be turned on. When an over-voltage occurs, a level of the over-voltage detection signal OVD may correspond to the first logic value (e.g., logic "1"), and the elements of the audio output generator 100 may be turned off.

Logic "0" of the over-voltage detection signal OVD and logic "0" of the connection signal LDET may mean a state in which the audio jack AJ is connected to the audio terminal 1340 ("jack-in") (refer to FIG. 5). Accordingly, the jack-out mask circuit 119a may be configured to generate the jack connection detection signal JCD having a level of the second logic value (e.g., logic "0").

Logic "0" of the over-voltage detection signal OVD and logic "1" of the connection signal LDET may mean a state in which the audio jack AJ is not connected to the audio terminal 1340 ("jack-out") (refer to FIG. 4). Accordingly, the jack-out mask circuit 119a may be configured to generate the jack connection detection signal JCD having a level of the first logic value (e.g., logic "1"). When a level of the over-voltage detection signal OVD corresponds to logic "0", a logic value of the jack connection detection signal JCD may be the same as a logic value of the connection signal LDET.

Logic "1" of the over-voltage detection signal OVD and logic "0" of the connection signal LDET may mean a state in which the audio jack AJ is connected to the audio terminal 1340 ("jack-in") (refer to FIG. 5). For example, when a negative over-voltage occurs, a level of the connection signal LDET may correspond to logic "0" even though a level of the over-voltage detection signal OVD corresponds to logic "1". In this case, the jack-out mask circuit 119a may be configured to generate the jack connection detection signal JCD having a level of logic "0" as the connection signal LDET does so.

However, logic "1" of the over-voltage detection signal OVD and logic "1" of the connection signal LDET may be associated with the case in which it is determined that the audio jack AJ is not connected even though the audio jack AJ is connected to the audio terminal 1340 (refer to FIG. 15). Accordingly, the jack-out mask circuit 119a may be configured to generate the jack connection detection signal JCD having a level of logic "0" unlike the connection signal LDET.

A jack-out state detected while a level of the over-voltage detection signal OVD corresponds to logic "1" may be a result of a misoperation due to a positive over-voltage. Accordingly, the jack-out mask circuit 119a may be configured to mask the jack-out state indicated by logic "1" of the connection signal LDET. Instead, the jack-out mask circuit 119a may be configured to output the jack connection detection signal JCD of logic "0" indicating a jack-in state. Accordingly, the connection signal LDET of logic "1" received while a level of the over-voltage detection signal OVD corresponds to logic "1" may be ignored by the audio output generator 100.

Referring to FIG. 18, between time t1 and t2, a negative over-voltage may occur, and a level of the over-voltage detection signal OVD may correspond to logic "1". Meanwhile, when the audio jack AJ is connected to the audio terminal 1340, logic "0" of the connection signal LDET may be maintained. A level of the jack connection detection signal JCD may correspond to logic "0" based on logic "1" of the over-voltage detection signal OVD and logic "0" of the connection signal LDET.

However, between time t3 and t4, a positive over-voltage may occur, and a level of the over-voltage detection signal OVD may correspond to logic "1". As described with reference to FIG. 15, even though the audio jack AJ is connected to the audio terminal 1340, a level of the connection signal LDET may change to correspond to logic "1". The jack-out mask circuit 119a of FIG. 16 may be configured to generate the jack connection detection signal JCD having a level of logic "0", based on logic "1" of the over-voltage detection signal OVD and logic "1" of the connection signal LDET ("jack-out masking").

Thus, the jack connection detection signal JCD may be referenced to determine absence or connection of the audio jack AJ, instead of the connection signal LDET being referenced. Accordingly, a misoperation due to a positive over-voltage may be prevented.

For example, when a level of the jack connection detection signal JCD corresponds to logic "0" (e.g., when the audio jack AJ is connected), the DAC 130 and the output driver 150 may be activated. On the other hand, when a level of the jack connection detection signal JCD corresponds to logic "1" (e.g., when the audio jack AJ is not connected), the DAC 130 and the output driver 150 may be deactivated.

When the audio output generator 100 receives the connection signal LDET (e.g., the connection signal LDET of logic "1") indicating that the audio jack AJ is not connected to the audio terminal 1340 while the elements of the audio output generator 100 are turned on (e.g., while a level of the over-voltage detection signal OVD corresponds to logic "0"), a level of the jack connection detection signal JCD may correspond to logic "1". Accordingly, the DAC 130 and the output driver 150 may be deactivated with regard to logic "1" of the jack connection detection signal JCD. In this case, power consumption of the audio output generator 100 may be reduced.

On the other hand, when the audio output generator 100 receives the connection signal LDET (e.g., the connection signal LDET of logic "1") indicating that the audio jack AJ is not connected to the audio terminal 1340 while the elements of the audio output generator 100 are turned off (e.g., while a level of the over-voltage detection signal OVD corresponds to logic "1"), a level of the jack connection detection signal JCD may correspond to logic "0" (e.g., between time t3 and t4). Accordingly, the DAC 130 and the output driver 150 may not be deactivated with regard to logic "0" of the jack connection detection signal JCD, and the audio output generator 100 may ignore the connection signal LDET of logic "1."

The above descriptions are intended to provide example configurations and operations for implementing the present invention. The scope and spirit of the present invention may include implementations which are obtained by simply changing or modifying the above example embodiments, in addition to the above-described example embodiments. Also, the scope and spirit of the present invention includes implementations which are accomplished by easily changing or modifying the above-described example embodiments.

What is claimed is:

1. An electronic circuit comprising:
an output generator comprising,
switches configured to generate an output signal based on input data, and
transistors configured to drive an output of the output signal to an output terminal; and
an over-voltage detector configured to provide an over-voltage detection signal of a first logic value to the output generator such that the switches and the transistors are turned off in response to an amplitude of a voltage of the output terminal being greater than an allowable amplitude,
wherein the output generator is further configured to,
generate a converted over-voltage detection signal of a first logic value based on the over-voltage detection signal; such that the switches and the transistors turned off in response to the first logic value of the over-voltage detection signal remain turned off, and
generate the converted over-voltage detection signal of a second logic value such that the switches and the transistors, which have remained turned off in response to the first logic value of the converted over-voltage detection signal, are turned on in response to (i) elapse of a reference time and (ii) the over-voltage detection signal changing from a second logic value of the over-voltage detection signal to the first logic value of the over-voltage detection signal during the reference time, the reference time starting when the first logic value of the over-voltage detection signal changes to the second logic value of the over-voltage detection signal.

2. The electronic circuit of claim 1, wherein when the switches and the transistors are turned off in response to the first logic value of the over-voltage detection signal, the switches and the transistors turned off are configured to remain turned off at least during the reference time after the switches and the transistors are turned off.

3. The electronic circuit of claim 1, wherein the output generator is further configured to maintain the first logic value of the converted over-voltage detection signal in response to (i) elapse of the reference time and (ii) the over-voltage detection signal changing from a second logic value of the over-voltage detection signal to the first logic value of the over-voltage detection signal during the reference time.

4. The electronic circuit of claim 1, wherein the output generator is further configured to control a gain for the output signal in response to the second logic value of the converted over-voltage detection signal, such that the gain increases according to a reference ratio for a time, during a control time after the switches and the transistors are turned on.

5. The electronic circuit of claim 1, wherein the output generator is further configured to output a selection signal, such that the over-voltage detection signal or the converted over-voltage detection signal selectively turns on and turns off the switches and the transistors, wherein
   in response to the switches and the transistors being turned on, the over-voltage detection signal is selected based on the selection signal such that the over-voltage detection signal turns off the switches and the transistors, and
   in response to the switches and the transistors being turned off, the converted over-voltage detection signal is selected based on the selection signal such that the converted over-voltage detection signal turns on the switches and the transistors.

6. The electronic circuit of claim 1, wherein:
   the output generator further comprises a timer configured to provide a notification indicating that the reference time has elapsed, and
   the timer is initialized in response to the first logic value of the over-voltage detection signal changing to the second logic value of the over-voltage detection signal, wherein
   the output generator is further configured to change the first logic value of the converted over-voltage detection signal to the second logic value of the converted over-voltage detection signal in response to the notification from the timer.

7. The electronic circuit of claim 1, wherein:
   the output generator further comprises,
      a digital signal processor configured to process the input data;
      a digital-to-analog converter configured to convert the processed input data to an analog signal; and
      an output driver configured to drive the output of the output signal with the transistors, based on the analog signal,
   the output generator is further configured to receive a connection signal associated with whether an external connector is connected to an external terminal, and
   the digital-to-analog converter and the output driver are activated or deactivated based on the connection signal, wherein
      in response to the connection signal indicating that the external connector is not connected to the external terminal while the switches and the transistors are turned on, the digital-to-analog converter and the output driver are deactivated, and
      in response to the connection signal indicating that the external connector is not connected to the external terminal while the switches and the transistors, which have been turned off in response to the first logic value of the over-voltage detection signal, remain turned off, the digital-to-analog converter and the output driver are not deactivated.

8. An electronic circuit comprising:
   an output generator configured to output an output signal to an output terminal; and
   an over-voltage detector configured to output an over-voltage detection signal of a first logic value such that elements included in the output generator are turned off in response to an amplitude of a voltage of the output terminal being greater than an allowable amplitude, wherein,
      the elements turned off in response to the first logic value of the over-voltage detection signal remain turned off at least until a reference time elapses, the reference time starting when the first logic value of the over-voltage detection signal changes to a second logic value of the over-voltage detection signal, and
      the elements, which have been turned off in response to the first logic value of the over-voltage detection signal, continue to remain turned off in response to (i) elapse of the reference time and (ii) the over-voltage detection signal changing from the second logic value of the over-voltage detection signal to the first logic value of the over-voltage detection signal during the reference time.

9. The electronic circuit of claim 8, wherein power consumption of the output generator decreases as the elements are turned off.

10. The electronic circuit of claim 8, wherein the output signal is not output from the output generator in response to the elements being turned off.

11. The electronic circuit of claim 8, wherein the elements, which have been turned off in response to the first logic value of the over-voltage detection signal, are turned on in response to (i) elapse of the reference time and (ii) the over-voltage detection signal not changing from the second logic value of the over-voltage detection signal to the first logic value of the over-voltage detection signal during the reference time.

12. The electronic circuit of claim 11, wherein:
   the output signal is output from the output generator in response to the elements being turned on, and
   the output generator is further configured to control a gain for the output signal such that the gain increases according to a reference ratio for a time, during a control time after the elements are turned on.

13. The electronic circuit of claim 12, wherein:
   the gain increases from negative infinity, during the control time after the elements are turned on such that an intensity of the output signal reaches an intensity indicated based on input data directed to the output generator.

14. The electronic circuit of claim 8, wherein:
   power consumption of the output generator decreases, in response to the output generator receiving a connection signal indicating that an external connector is not connected to an external terminal while the elements are turned on, and
   the output generator is further configured to ignore the connection signal, in response to the output generator receiving the connection signal while the elements, which have been turned off in response to the first logic value of the over-voltage detection signal, remain turned off.

15. An electronic circuit comprising:
an output generator configured to output an output signal to an output terminal; and
an over-voltage detector configured to provide an over-voltage detection signal to the output generator, such that active elements included in the output generator are turned off,
wherein the over-voltage detector comprises,
   resistive elements configured to divide a voltage of the output terminal to output a divided voltage;
   a first comparator configured to compare the divided voltage with a first reference voltage, to output a first comparison result associated with whether the voltage of the output terminal is higher than a positive allowable voltage;
   a second comparator configured to compare the divided voltage with a second reference voltage lower than the first reference voltage, to output a second comparison result associated with whether the voltage of the output terminal is lower than a negative allowable voltage; and
   a logic circuit configured to generate the over-voltage detection signal based on the first comparison result and the second comparison result.

16. The electronic circuit of claim 15, wherein the divided voltage is lower than a voltage which would damage the first comparator and the second comparator.

17. The electronic circuit of claim 15, wherein:
in response to the divided voltage being higher than the first reference voltage or lower than the second reference voltage, the active elements are turned off in response to the over-voltage detection signal, and
in response to the divided voltage being lower than the first reference voltage and higher than the second reference voltage, the active elements are turned on.

18. The electronic circuit of claim 15, wherein:
the output generator is further configured to generate a converted over-voltage detection signal based on the over-voltage detection signal,
the converted over-voltage detection signal has a first logic value in response to a first logic value of the over-voltage detection signal,
the first logic value of the converted over-voltage detection signal is maintained at least during a reference time after the first logic value of the over-voltage detection signal changes to a second logic value of the over-voltage detection signal,
in response to the second logic value of the over-voltage detection signal changing to the first logic value of the over-voltage detection signal before the reference time elapses, the first logic value of the converted over-voltage detection signal continues to be maintained, and
in response to the second logic value of the over-voltage detection signal being maintained during the reference time, the first logic value of the converted over-voltage detection signal changes to a second logic value of the converted over-voltage detection signal.

19. The electronic circuit of claim 18, wherein the active elements are turned off in response to the first logic value of the over-voltage detection signal, and are turned on in response to the second logic value of the converted over-voltage detection signal.

20. The electronic circuit of claim 18, wherein:
the over-voltage detector further comprises a multiplexer configured to selectively output the over-voltage detection signal or the converted over-voltage detection signal, and
the active elements are turned on or turned off in response to an output of the multiplexer.

* * * * *

UNITED STATES PATENT AND TRADEMARK OFFICE
CERTIFICATE OF CORRECTION

PATENT NO. : 10,728,658 B2
APPLICATION NO. : 15/983460
DATED : July 28, 2020
INVENTOR(S) : Lee et al.

It is certified that error appears in the above-identified patent and that said Letters Patent is hereby corrected as shown below:

In the Claims

Column 26, Lines 31-61 should be corrected to read:
1. An electronic circuit comprising:
    an output generator comprising,
        switches configured to generate an output signal based on input data, and
        transistors configured to drive an output of the output signal to an output terminal; and
    an over-voltage detector configured to provide an over-voltage detection signal of a first logic value to the output generator such that the switches and the transistors are turned off in response to an amplitude of a voltage of the output terminal being greater than an allowable amplitude,
    wherein the output generator is further configured to,
        generate a converted over-voltage detection signal of a first logic value based on the over-voltage detection signal such that the switches and the transistors turned off in response to the first logic value of the over-voltage detection signal remain turned off, and
        generate the converted over-voltage detection signal of a second logic value such that the switches and the transistors, which have remained turned off in response to the first logic value of the converted over-voltage detection signal, are turned on in response to (i) elapse of a reference time and (ii) the over-voltage detection signal not changing from a second logic value of the over-voltage detection signal to the first logic value of the over-voltage detection signal during the reference time, the reference time starting when the first logic value of the over-voltage detection signal changes to the second logic value of the over-voltage detection signal.

Signed and Sealed this
Thirty-first Day of May, 2022

*Katherine Kelly Vidal*

Katherine Kelly Vidal
*Director of the United States Patent and Trademark Office*